US012709204B2

(12) United States Patent
Schroeder et al.

(10) Patent No.: US 12,709,204 B2
(45) Date of Patent: Aug. 18, 2026

(54) SEAT ASSEMBLY AND BRACKET

(71) Applicant: Lear Corporation, Southfield, MI (US)

(72) Inventors: Dirk Schroeder, Ginsheim-Gustavsburg (DE); Dinesh Kumar, Ginsheim-Gustavsburg (DE); Mladen Humer, West Bloomfield, MI (US); Stefan Frank, Ismaning (DE); Nikhil Sarmokadam, Pune (IN); Mrutunjay Bhoite, Kolhapur (IN); Delson Devaasir, Pune (IN)

(73) Assignee: Lear Corporation, Southfield, MI (US)

( * ) Notice: Subject to any disclaimer, the term of this patent is extended or adjusted under 35 U.S.C. 154(b) by 260 days.

(21) Appl. No.: 18/507,271

(22) Filed: Nov. 13, 2023

(65) Prior Publication Data

US 2024/0174143 A1 May 30, 2024

(30) Foreign Application Priority Data

Nov. 24, 2022 (DE) ......................... 102022131136.8

(51) Int. Cl.
*B60N 2/56* (2006.01)

(52) U.S. Cl.
CPC ................................. *B60N 2/5621* (2013.01)

(58) Field of Classification Search
CPC .. B60N 2/5621; B60N 2/5635; B60N 2/5657; B60N 2/7041; B60N 2/7094
See application file for complete search history.

(56) References Cited

U.S. PATENT DOCUMENTS

| | | | | |
|---|---|---|---|---|
| 6,048,024 | A * | 4/2000 | Wallman | B60N 2/5635 297/452.42 |
| 6,719,534 | B2 | 4/2004 | Aoki | |
| 7,647,780 | B2 | 1/2010 | Aoki | |
| 7,905,545 | B2 | 3/2011 | Andersson | |
| 8,757,726 | B2 | 6/2014 | Oota | |
| 9,694,716 | B2 * | 7/2017 | Masuda | B60N 2/565 |
| 10,471,863 | B2 * | 11/2019 | Tsuzaki | B60N 2/68 |
| 10,710,480 | B2 | 7/2020 | Iacovone | |
| 11,027,631 | B2 * | 6/2021 | Hoshi | B60N 2/682 |
| 11,091,072 | B2 | 8/2021 | Greenwood | |
| 11,332,053 | B2 * | 5/2022 | Longatte | B60N 2/5642 |
| 2018/0361892 | A1 | 12/2018 | Iacovone | |
| 2020/0339018 | A1 | 10/2020 | Longatte | |
| 2024/0391368 | A1 * | 11/2024 | Philip | B60N 2/5635 |

FOREIGN PATENT DOCUMENTS

| | | | |
|---|---|---|---|
| CN | 204095601 | U | 1/2015 |
| CN | 111845499 | A | 10/2020 |
| FR | 3036336 | A1 | 11/2016 |
| KR | 101488179 | B1 | 1/2015 |

OTHER PUBLICATIONS

German Office Action dated Nov. 3, 2023, DE102022131136.8 (w_machine_translation).

* cited by examiner

*Primary Examiner* — David R Dunn
(74) *Attorney, Agent, or Firm* — Reising Ethington P.C.

(57) ABSTRACT

A bracket for a seat assembly includes a bracket body having a receptacle configured to receive at least a portion of an air mover of said seat assembly. The bracket also includes at least one bracket flange extending from the bracket body. The at least one bracket flange connects with said air mover via a connector to connect said air mover with the bracket body. The bracket body and/or the at least one bracket flange connect to a suspension portion of said seat assembly.

20 Claims, 16 Drawing Sheets

SEAT ASSEMBLY AND BRACKET

CROSS-REFERENCE TO RELATED APPLICATION

This application claims priority to German Patent Application No. DE 10 2022 131 136.8, filed Nov. 24, 2022, the contents of which is hereby incorporated by reference in its entirety.

TECHNICAL FIELD

The present disclosure generally relates to seat assemblies, including seat assemblies that may be used in connection with vehicles, and brackets for seat assemblies.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
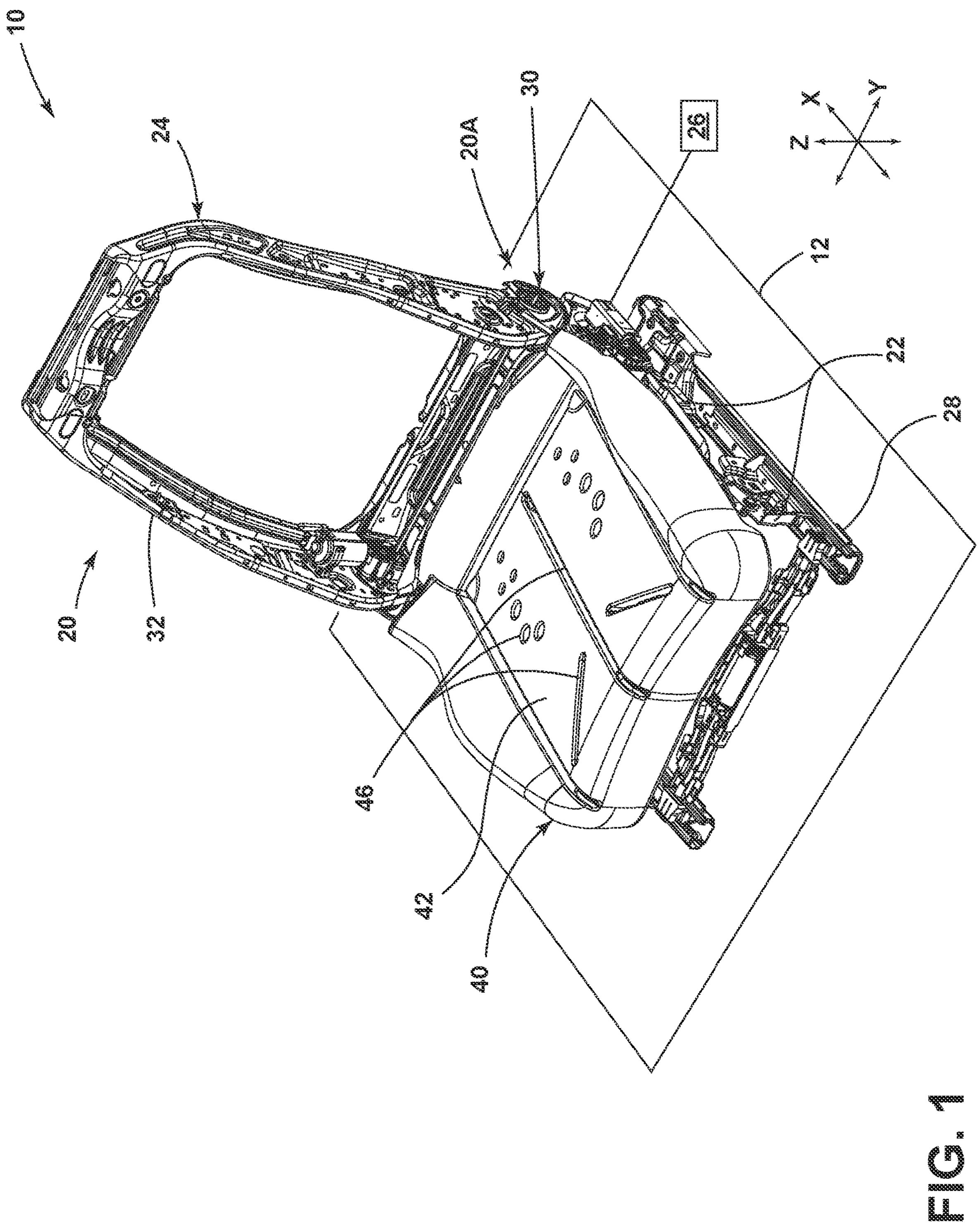
FIG. 1 is a perspective view generally illustrating an embodiment of a seat assembly according to teachings of the present disclosure.
Figure 2:
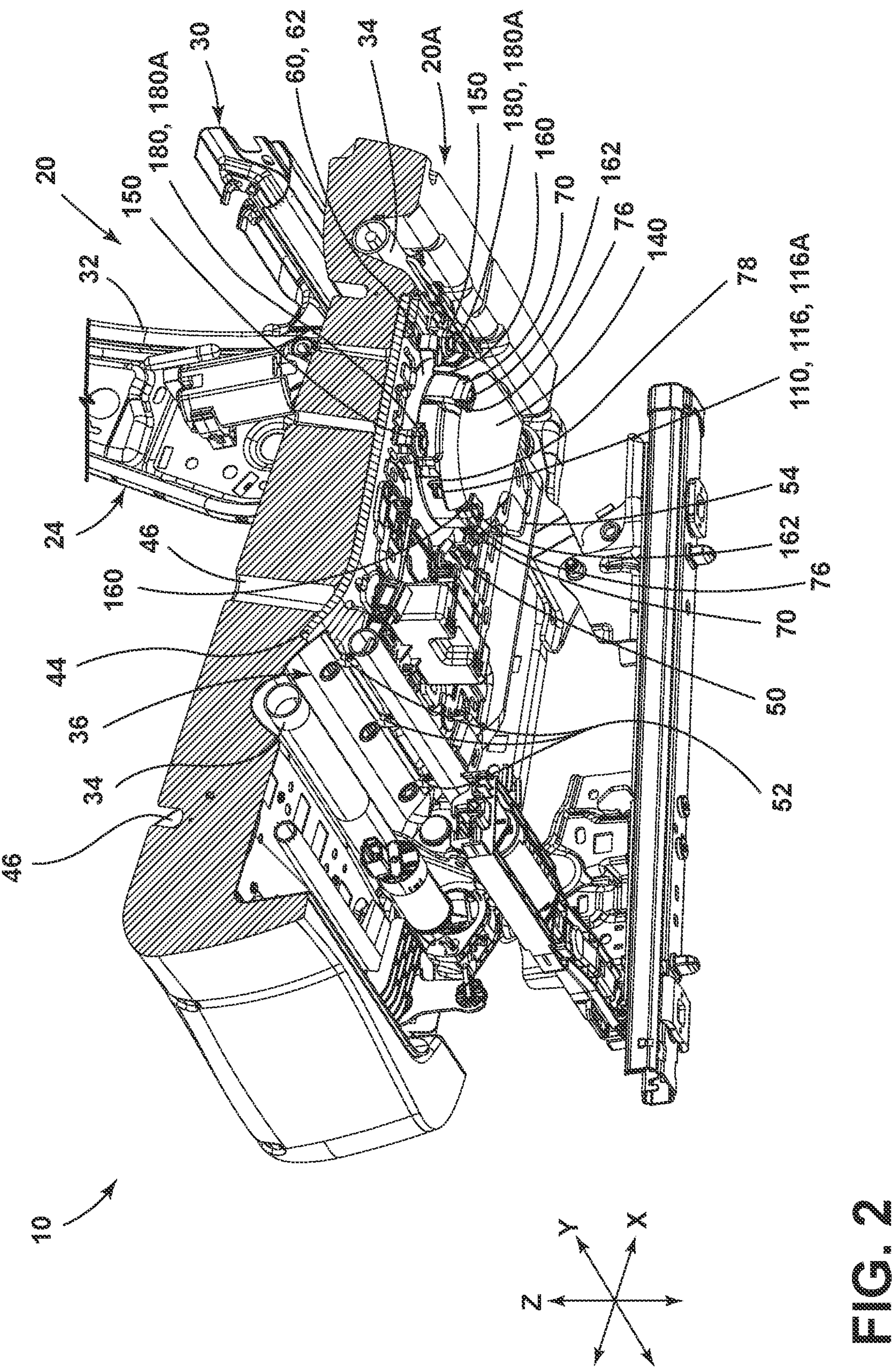
FIG. 2 is a cross-sectional view generally illustrating an embodiment of a seat assembly according to teachings of the present disclosure.

FIG. 1 presents a perspective view of an embodiment of a seat assembly 20. FIG. 2 presents a cross-sectional view of the seat assembly 20. The seat assembly 20 is configured as a modular seat assembly 20 that includes a plurality of components which, when assembled, form a vehicle seat, such as for a passenger vehicle 10 (e.g., cars, vans, SUVs, trucks, buses, trains, boats, ships, planes). The seat assembly 20 may be utilized in any other appropriate situation or apparatus, such as homes, office buildings, theaters, stadiums, recreational vehicles, commercial vehicles, and/or agricultural equipment, among others.

Referring to FIGS. 1 and 2, the seat assembly 20 includes a seat base 22, a seat frame 30, a seat bottom 40, a seatback 24, a seat adjuster 26, a track assembly 28, a suspension portion 50, at least one air mover 110, and a bracket 140. The seat frame 30 is connected to the seat base 22, which is removably and/or slidably connected to a track assembly 28 (e.g., for vertical removal and/or longitudinal movement). The track assembly 28 is connected to a floor 12 of the vehicle 10. The seat bottom 40 and/or the seatback 24 are connected to and/or supported by the seat frame 30. Optionally, the seat frame 30, the seat bottom 40, and/or the seatback 24 are configured to move relative to one another (e.g., adjust, recline, rotate, fold, collapse) and/or along the track assembly 28 via actuation of the seat adjuster 26.

Figure 11:
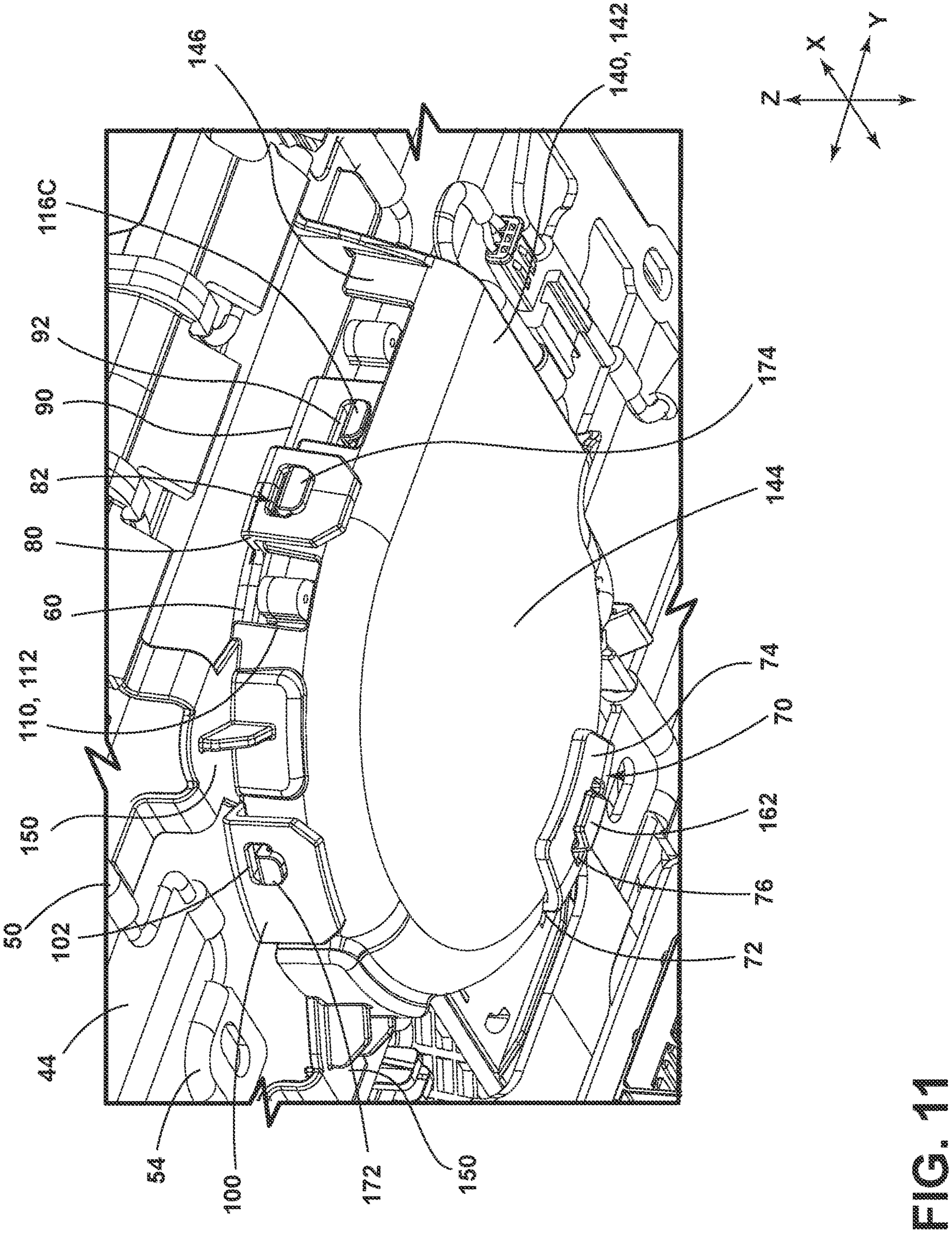
FIG. 11 is a perspective view generally illustrating an embodiment of an adapter including a first, second, third, and fourth adapter flange, a bracket including a first and second latch, and an air mover according to teachings of the present disclosure.
Figure 12:
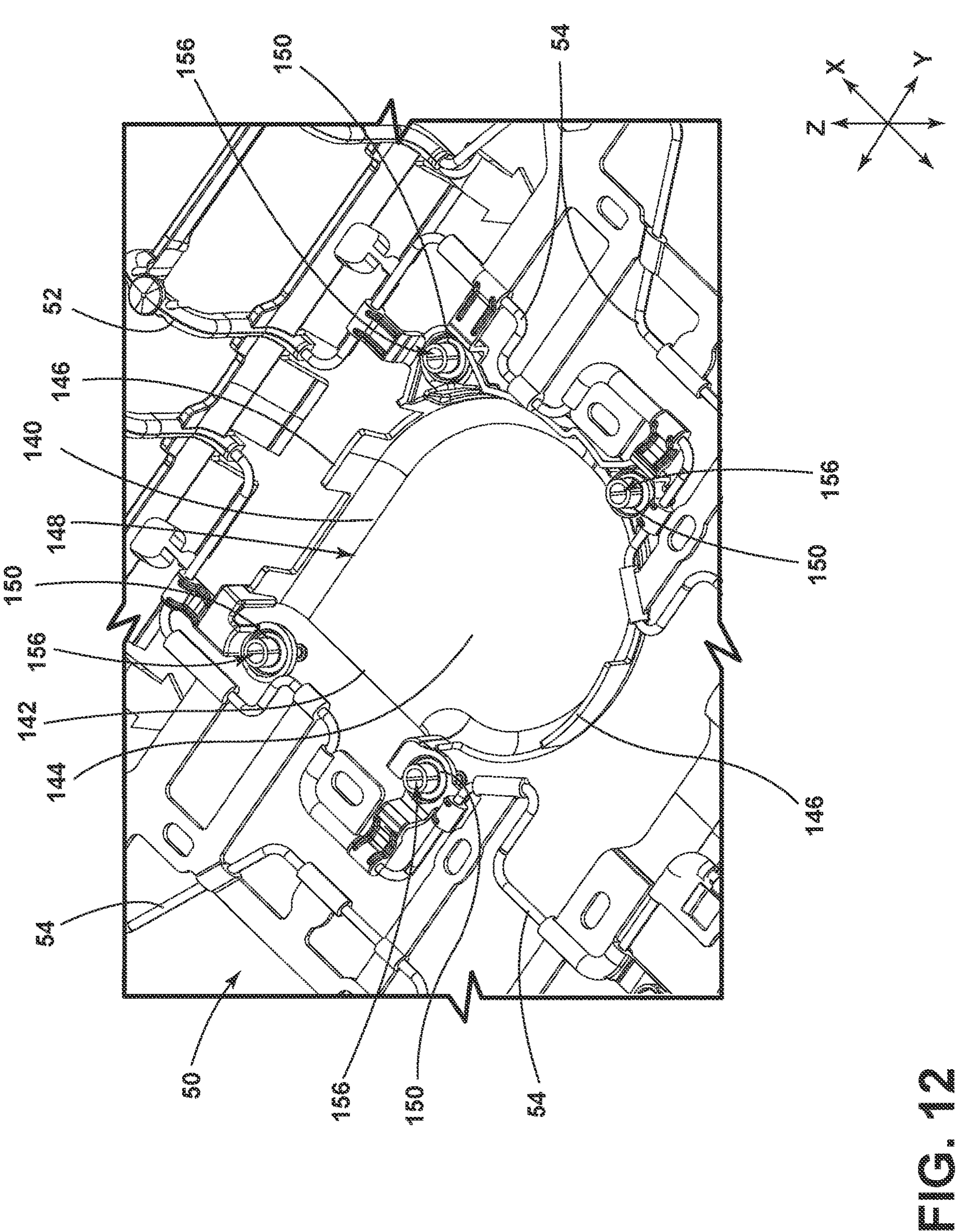
FIG. 12 is a perspective view generally illustrating an embodiment of a suspension portion and a bracket according to teachings of the present disclosure.
Figure 13:
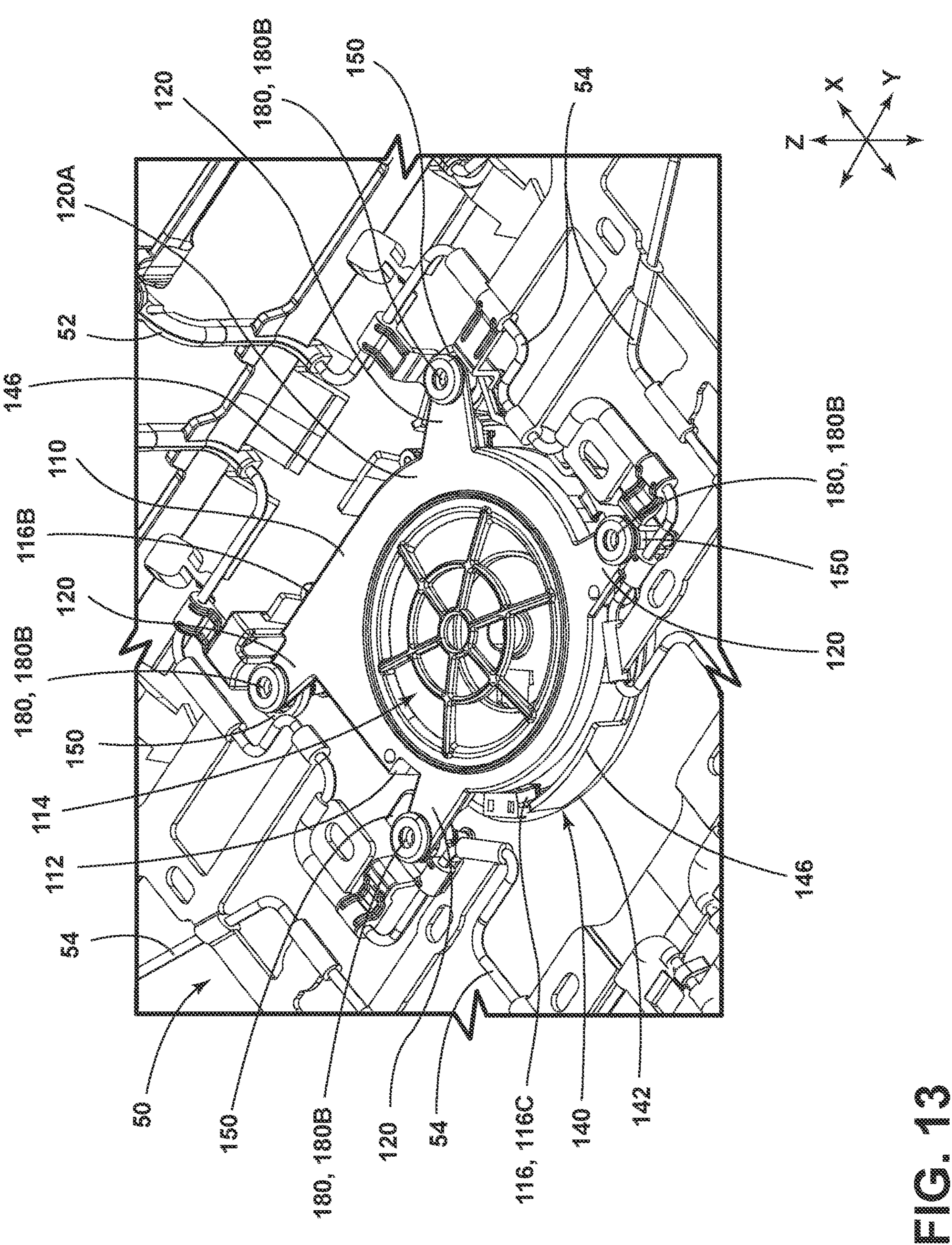
FIG. 13 is a perspective view generally illustrating an embodiment of a suspension portion, a bracket, and an air mover according to teachings of the present disclosure.
Figure 14:
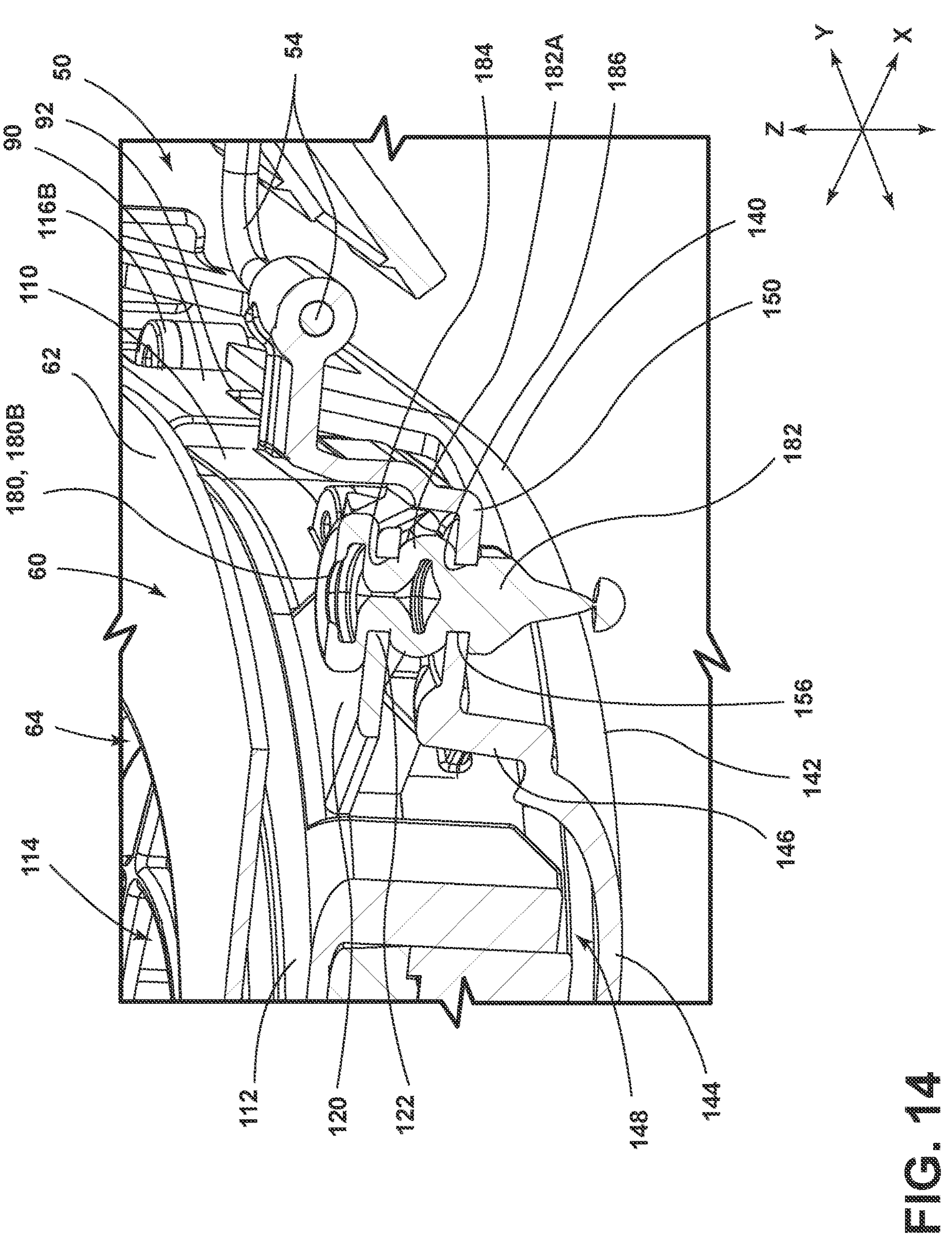
FIG. 14 is a cross-sectional view generally illustrating an embodiment of a suspension portion, a bracket, an air mover, and a rubber push fastener according to teachings of the present disclosure.
Figure 15:
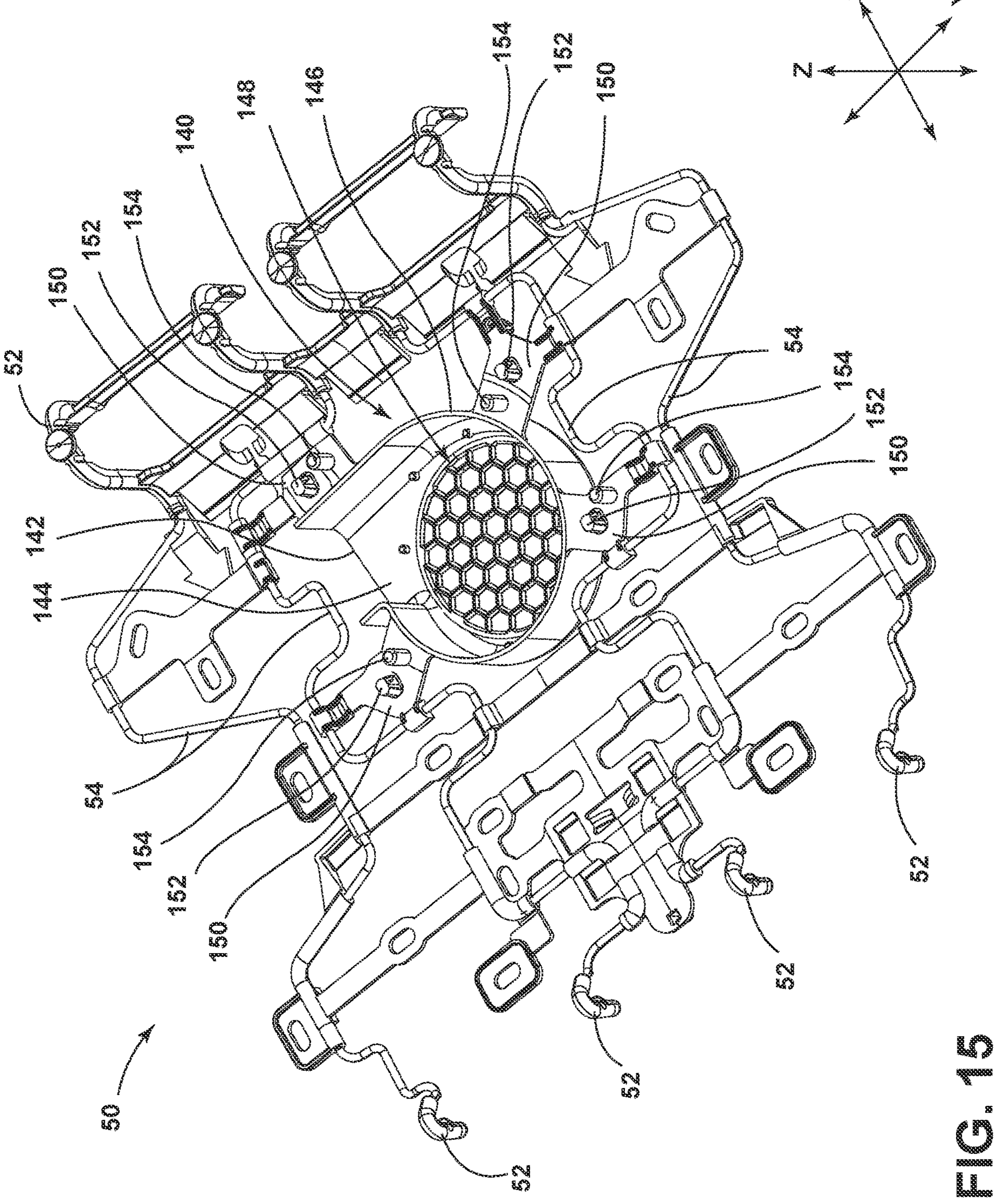
FIG. 15 is a perspective view generally illustrating an embodiment of a suspension portion and a bracket including first connectors and pins according to teachings of the present disclosure.
Figure 16:
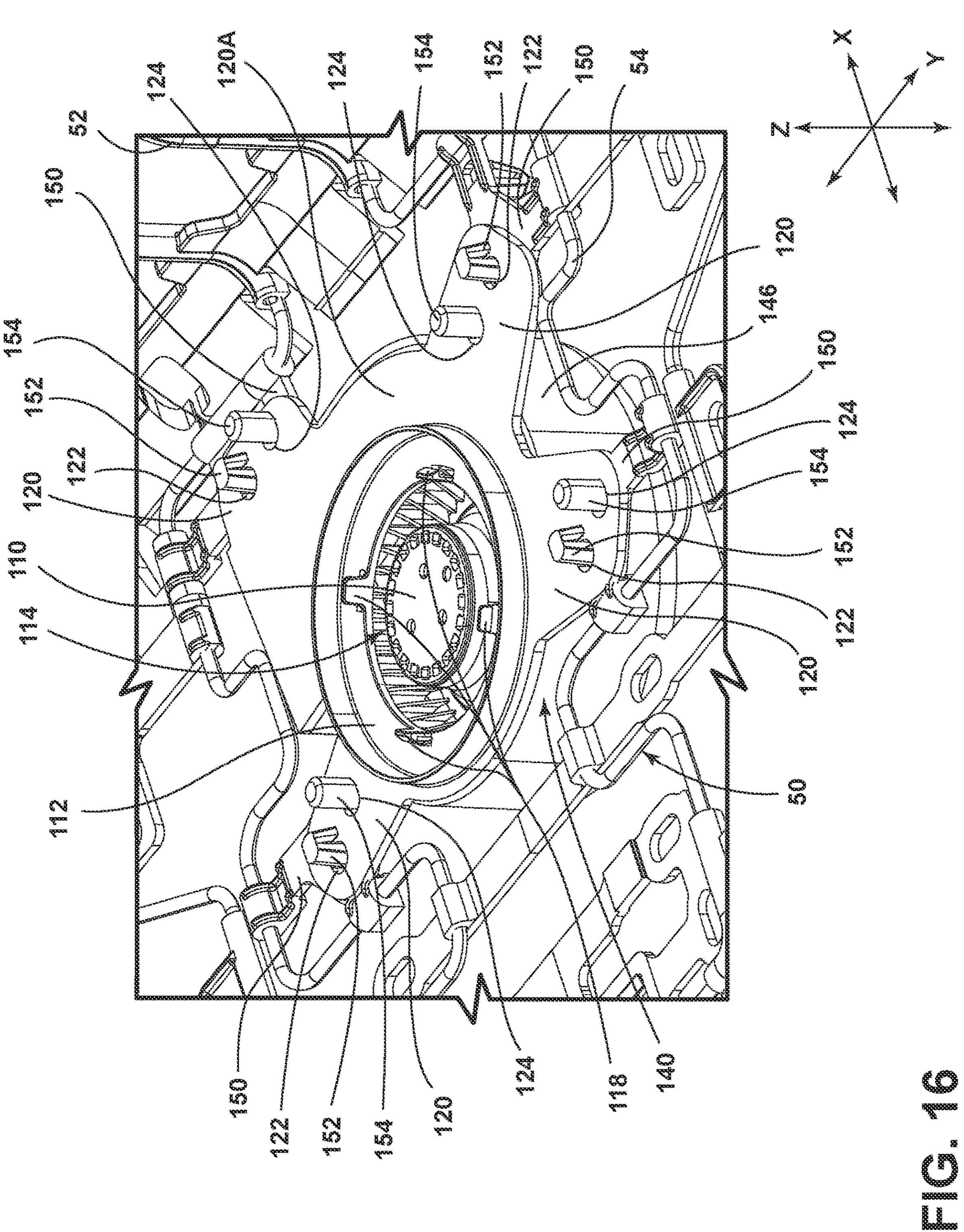
FIG. 16 is a perspective view generally illustrating an embodiment of a suspension portion, a bracket including first connectors and pins, and an air mover according to teachings of the present disclosure.

Referring to FIG. 2, the seat assembly 20 and/or the seat bottom 40 includes an adapter 60 disposed on and/or connected to the seat bottom 40. An adapter 60 and a bracket 140 are generally illustrated in FIGS. 2-10. Another configuration of the adapter 60 and the bracket 140 is generally illustrated in FIG. 11. Another configuration of the adapter 60 and the bracket 140 is generally illustrated in FIGS. 12-14. Another configuration of the adapter 60 and the bracket 140 is generally illustrated in FIGS. 15-16. One or more features and/or structures described with respect to different configurations may be utilized and/or combined in a single embodiment as appropriate and/or desired.

Referring to FIGS. 1 and 2, the seat frame 30 includes a seatback frame 32 and a seat bottom frame 34. The seat bottom frame 34 is disposed in and/or connected to the seat bottom 40. The seatback frame 32 is disposed in and/or connected to the seatback 24. The seat bottom frame 34 and the seatback frame 32 are connected to one another via a connector, such as a bracket, a fastener, and/or a hinge. Alternatively, the seat frame 30, the seat bottom frame 34, and/or the seatback frame 32 may be collectively formed as a single, unitary component such that the seat frame 30 is a monolithic structure.

Referring to FIG. 2, the seat bottom frame 34 has and/or defines an opening 36. The opening 36 facilitates deformation of at least portions of the seat bottom 40 (e.g., a cushion 42, an air conducting layer 44) that may occur when a force is applied thereto, such as when a user sits on the seat bottom 40 and/or seat assembly 20.

Figure 3:
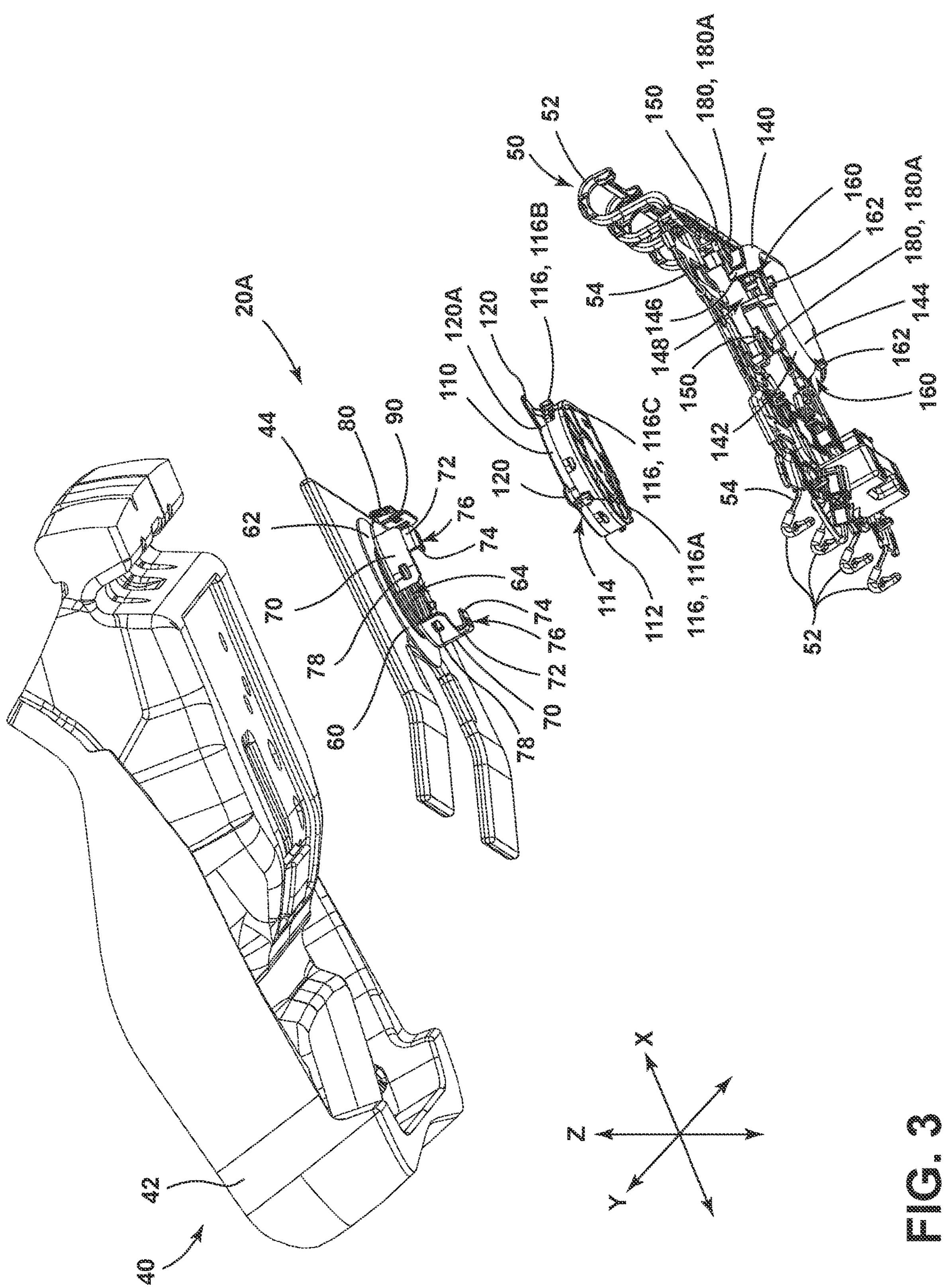
FIG. 3 is an exploded view generally illustrating portions of an embodiment of a seat assembly according to teachings of the present disclosure.

FIG. 3 presents a partially exploded view of the seat bottom 40, the suspension portion 50, the air mover 110, and the bracket 140 of the seat assembly 20. Referring to FIGS. 2 and 3, the seat bottom 40 includes a cushion 42 and an air conducting layer 44 (e.g., a ventilation mat) through which air may be passed, circulated, and/or distributed, such as to one or more apertures 46 of the seat bottom 40. The air conducting layer 44 is substantially planar and is disposed generally perpendicularly or obliquely to a Z-direction if/when the seat bottom 40 is in a horizontal/design seating position (e.g., when the seat bottom 40 is disposed substantially parallel to the vehicle floor 12). In some embodiments, the air conducting layer 44 is similar in shape to the seat bottom 40. Optionally, the air conducting layer 44 has other appropriate shapes. The air conducting layer 44 is connected to the cushion 42. The air conducting layer 44 is at least partially disposed in the cushion 42 (e.g., is disposed in a recess in a bottom surface of the cushion 42 that faces away from a user). Optionally, the air conducting layer 44 is disposed outside of the cushion 42 or is configured as a region/section of the cushion 42.

Referring to FIGS. 2-4, 6-9, 12-16, the suspension portion 50 is connected to the seat bottom frame 34 and extends at least partially (e.g., completely, in some configurations) across the opening 36 of the seat bottom frame 34 such that the suspension portion 50 is suspended below the opening 36 (sec, e.g., FIG. 2). Optionally, the suspension portion 50 is suspended within the opening 36 and/or over the opening 36. The suspension portion 50 is connected to the seat bottom frame 34 via a connector 52, such as a hook, a fastener, a clip, adhesive, screws, bolts, and/or other similar structure. The suspension portion 50 is configured as a wire suspension mat that includes a plurality of deformable suspension wires 54, but may have other appropriate configurations in one or more other embodiments. The cushion 42, the air conducting layer 44, and/or other portions of the seat bottom 40 are disposed on and supported by the suspension portion 50 (see, e.g., FIG. 2). The suspension portion 50 is deformable to compensate for an applied force, such as the weight of a user sitting on the seat bottom 40. During use, a force may be applied to the seat bottom 40, such as by a user sitting on the seat assembly 20. Due to the force, at least a portion of the seat bottom 40 (e.g., the cushion 42, the air conducting layer 44) is displaced, deformed, and/or compressed, which may cause the suspension portion 50 to deform into and/or further below the opening 36. In this manner, the suspension portion 50 provides increased comfort for the user sitting on the seat bottom 40 of the seat assembly 20.

Figure 4:
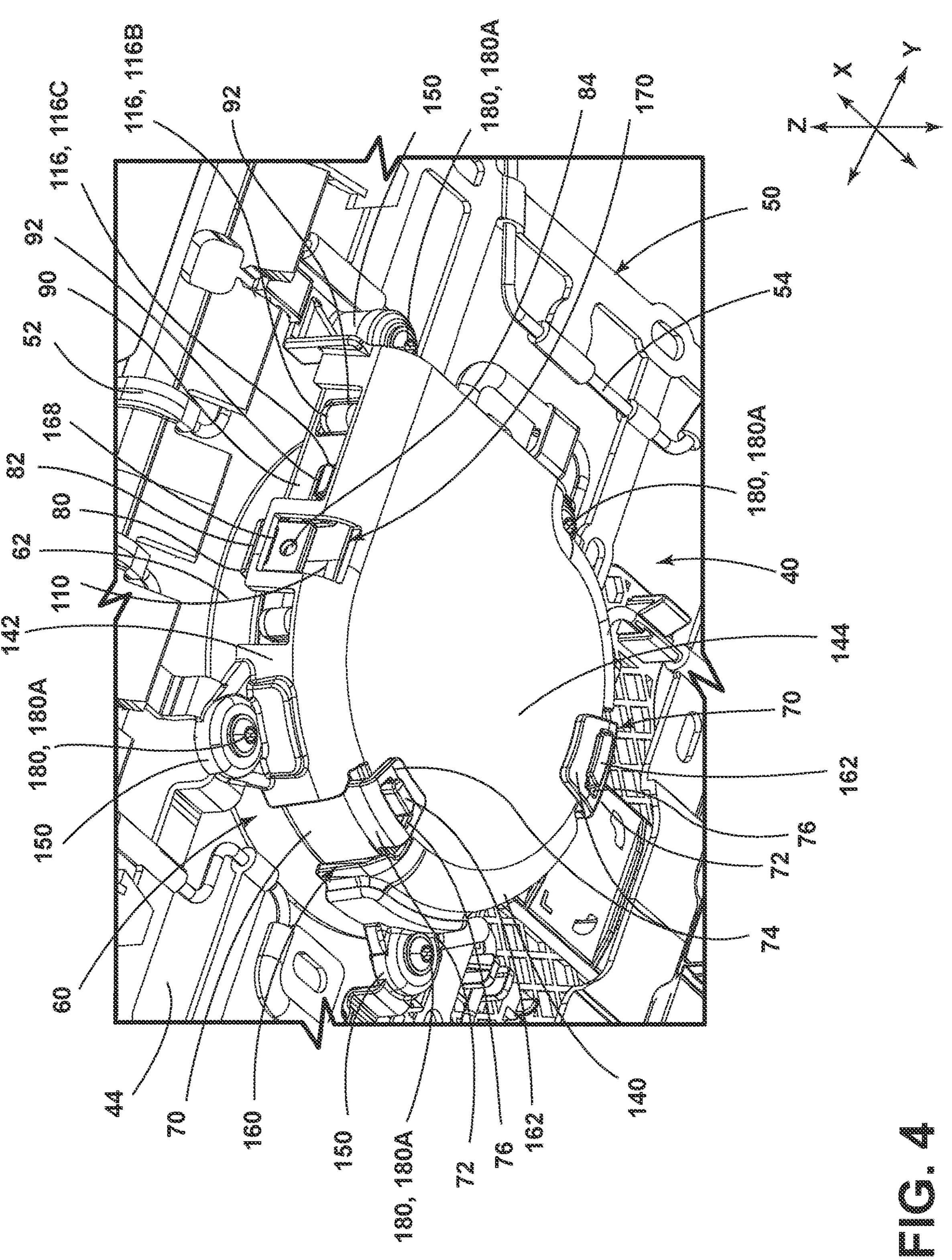
FIG. 4 is a perspective view generally illustrating an underside of an embodiment of a seat bottom according to teachings of the present disclosure.
Figure 5:
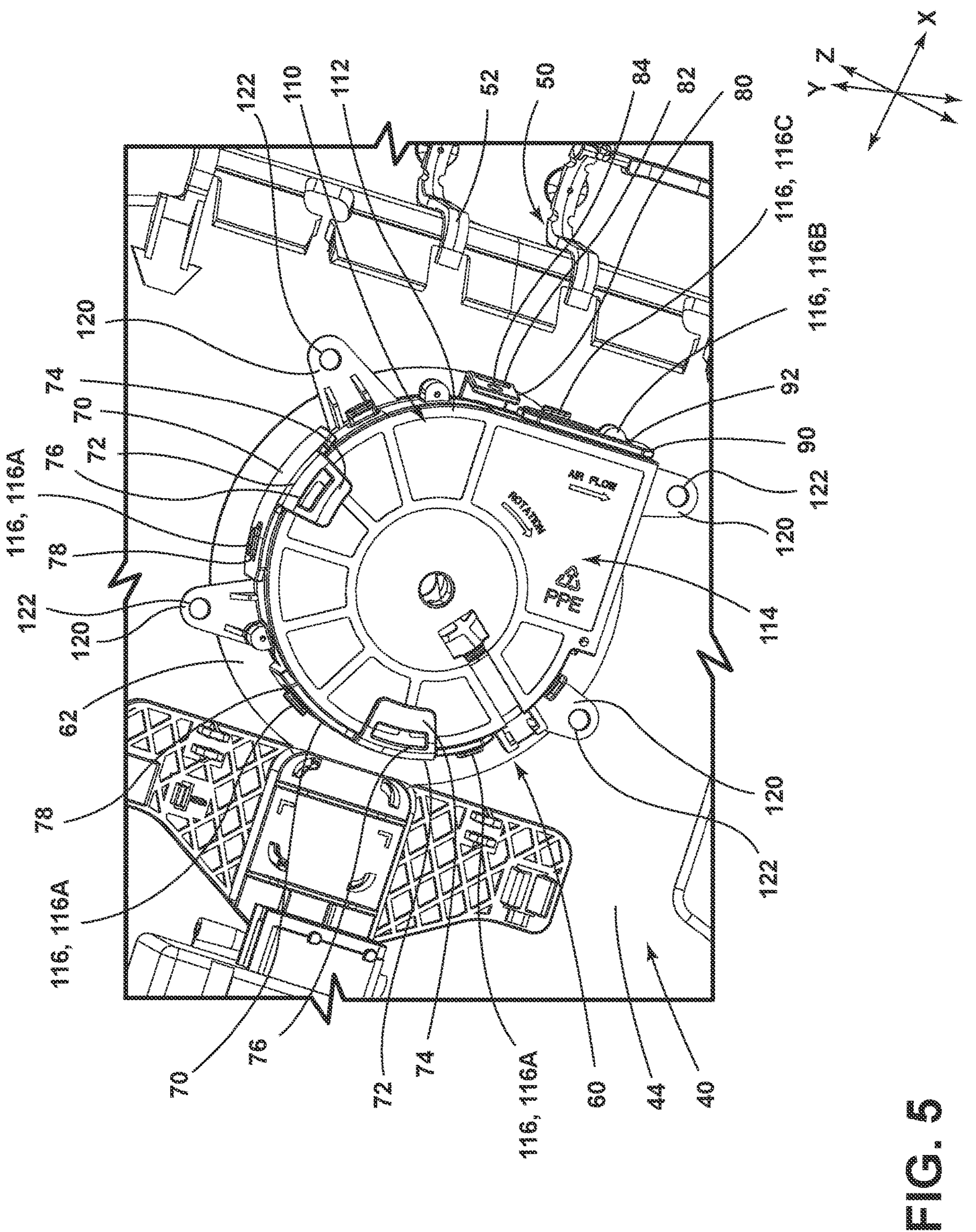
FIG. 5 is a perspective view generally illustrating an underside of an embodiment of a seat bottom with the suspension portion and bracket hidden/removed according to teachings of the present disclosure.
Figure 6:
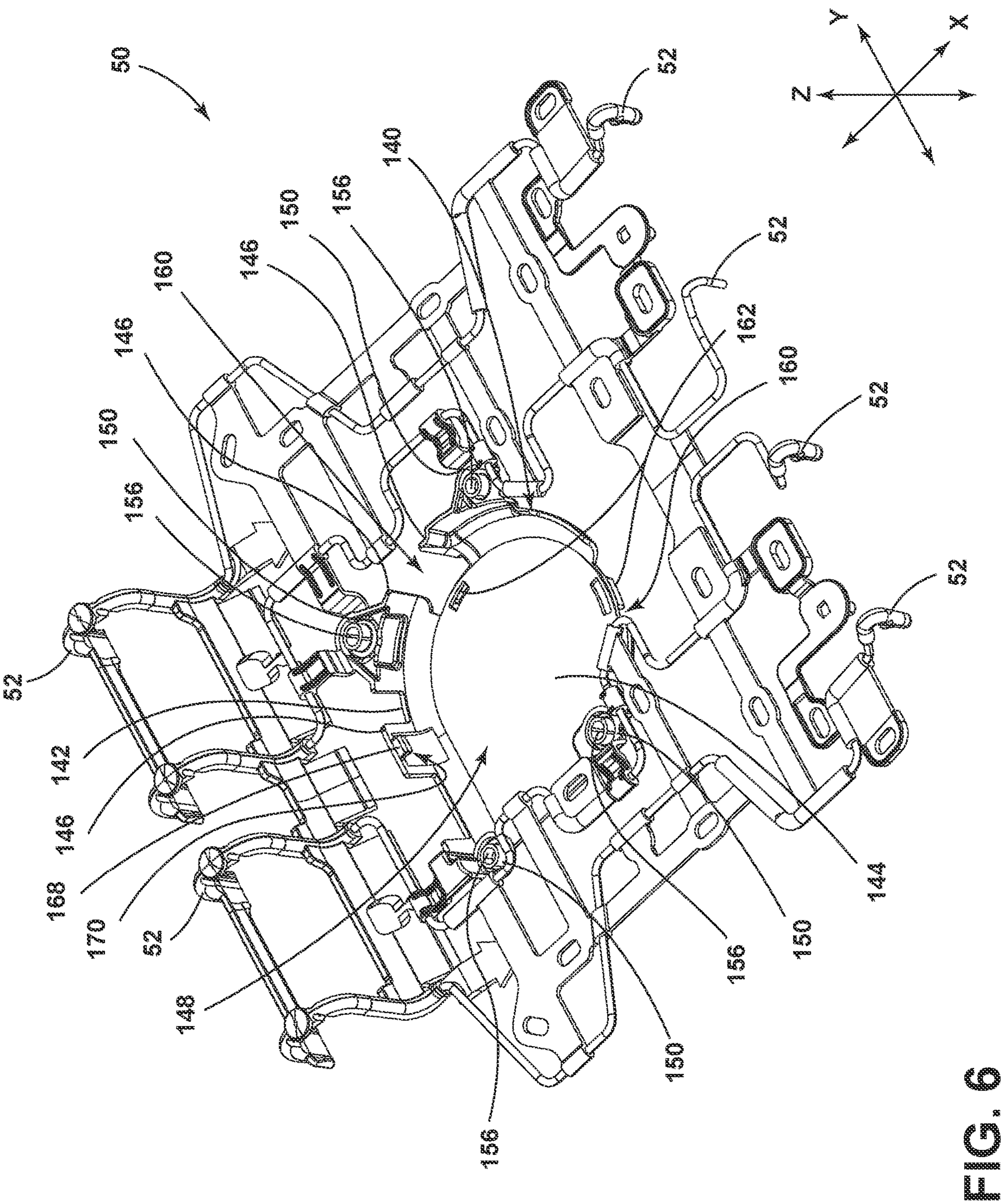
FIGS. 6 and 7 are perspective views generally illustrating an embodiment of a suspension portion and a bracket according to teachings of the present disclosure.
Figure 7:
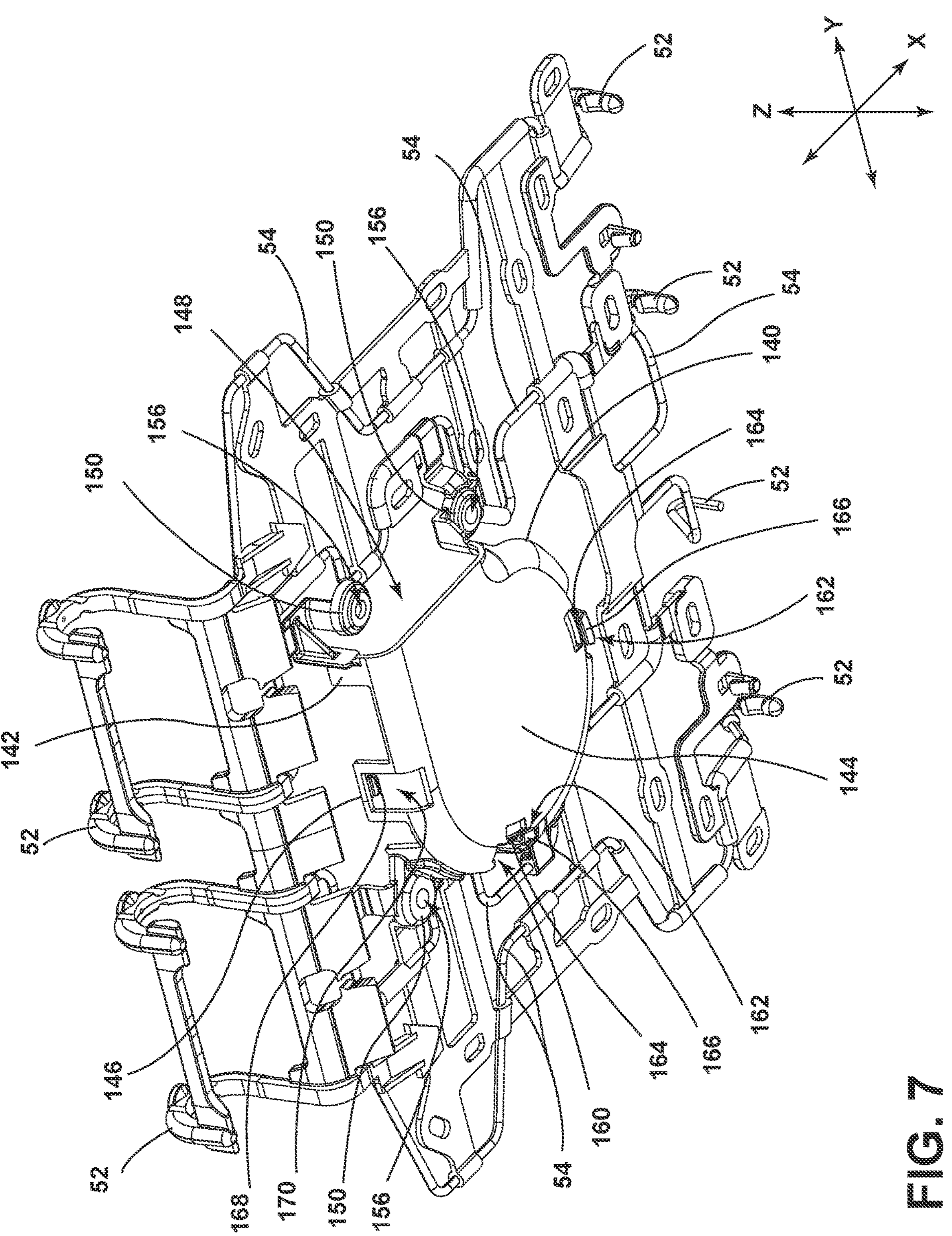
Figure 8:
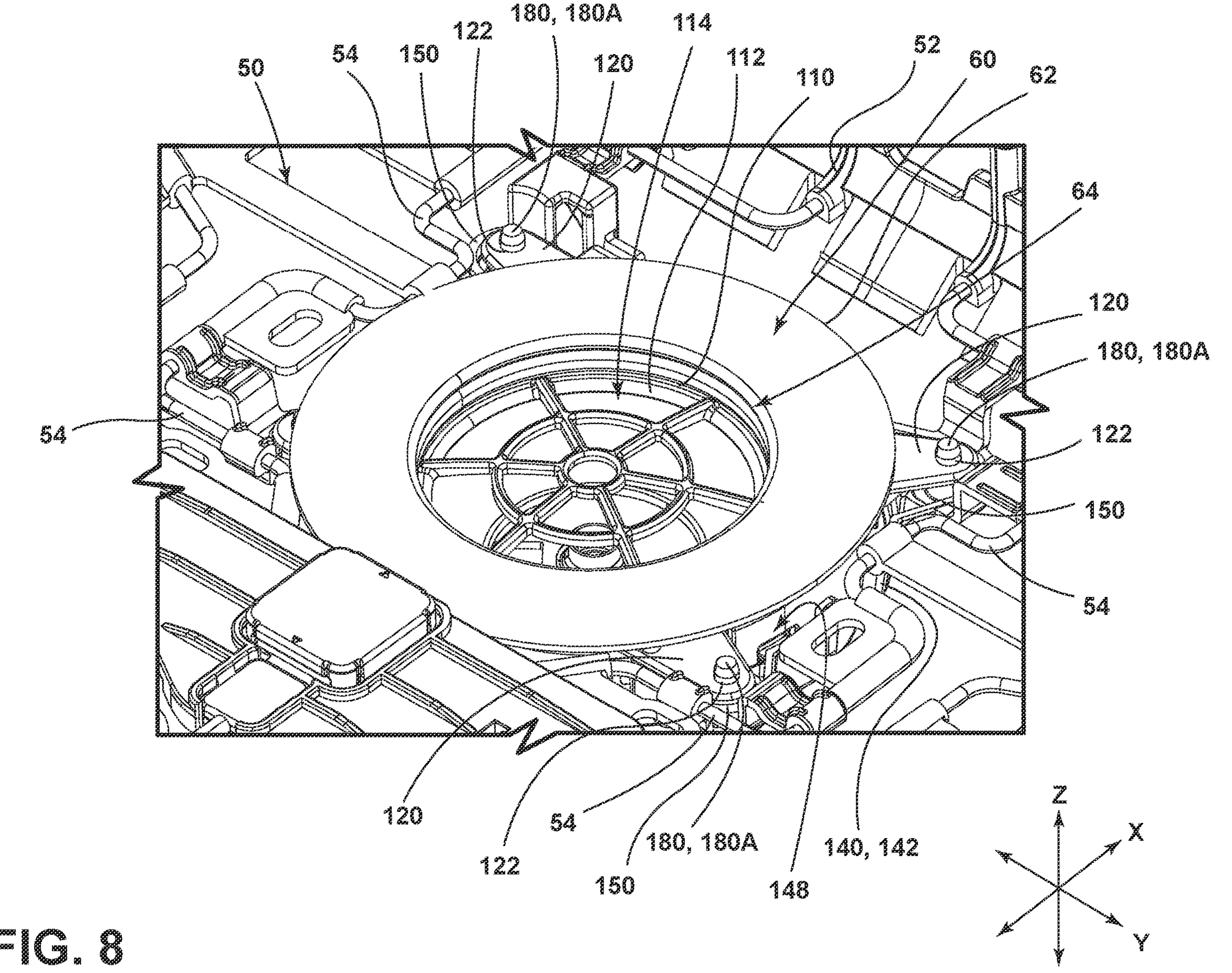
FIG. 8 is a perspective view generally illustrating an embodiment of a suspension portion, a bracket, an air mover, an adapter, and connectors/fasteners according to teachings of the present disclosure.

FIG. 4 presents a perspective view of an underside of the seat bottom 40 of the seat assembly 20. FIG. 5 presents a perspective view of an underside of the seat bottom 40 of the seat assembly 20 with the suspension portion 50 and the bracket 140 hidden/removed. Referring to FIGS. 2-5, the adapter 60 is configured to (e.g., releasably) engage and connect to an air mover 110, such as to connect the air mover 110 with the seat bottom 40. In some embodiments, such as the embodiment depicted in FIGS. 2-10 and the embodiment depicted in FIG. 11, the adapter 60 is also configured to engage and connect (e.g., releasably) to the bracket 140, such as to connect the suspension portion 50 with the seat bottom 40. In other embodiments, such as the embodiments depicted in FIGS. 12-16, the adapter 60 is configured to only connect to the air mover 110 (e.g., the adapter 60 is not configured to directly connect to the bracket 140 in some embodiments). Additionally and/or alternatively, the adapter 60 is configured to connect to one or more other elements/components of the seat assembly 20 (e.g., the cushion 42, the seat bottom frame 34). In some embodiments, the adapter 60 is designed and/or customized based on the configuration of the air mover 110.

Referring to FIGS. 2-6, 8, and 14, the adapter 60 includes an adapter body 62 that is connected to the air conducting layer 44. The adapter 60 is disposed on a bottom surface of the air conducting layer 44 that faces away from a user, but can be partially disposed and/or embedded in the air conducting layer 44 and/or the cushion 42 in other embodiments. The adapter body 62 includes an adapter opening 64 through which air may flow between the air mover 110 and one or more portions of the seat bottom 40 (e.g., the air conducting layer 44, the cushion 42). The adapter body 62 is a substantially annular disc that defines the adapter opening 64 (see, e.g., FIGS. 3-5, 8, 14). In other embodiments, the adapter body 62 has other appropriate shapes, does not have an adapter opening 64, has more than one adapter opening 64, and/or is configured to connect to one or more other elements/components of the seat assembly 20 (e.g., the cushion 42, the seat bottom frame 34, a duct).

Referring to FIGS. 2-5, 9-11, 14, the adapter body 62 includes a plurality of adapter flanges 70, 80, 90, 100 configured to engage and connect to an air mover 110 and/or a bracket 140. The adapter flanges 70, 80, 90, 100 project from the adapter body 62 generally toward the vehicle floor 12 and/or generally away from the air conducting layer 44 and/or the cushion 42 (e.g., generally in a Z-direction if/when the seat bottom 40 is in a horizontal/design seating position). The plurality of adapter flanges 70, 80, 90, 100 may include one or more types of flanges. The adapter body 62 may include any number of adapter flanges 70, 80, 90, 100 (e.g., two, three, four, other numbers) and any combination of types of adapter flanges 70, 80, 90, 100 as may be desired for a particular design of the seat assembly 20, so long as the adapter 60, the air mover 110, and the bracket 140 can be properly assembled. In some embodiments, such as the embodiments depicted in FIGS. 2-11, the adapter 60 includes a plurality of types of adapter flanges 70, 80, 90, 100 (e.g., one or more first adapter flanges 70, second adapter flanges 80, third adapter flanges 90, and/or fourth adapter flanges 100). In other embodiments, such as the embodiments depicted in FIGS. 12-16, the adapter 60 only includes a single type of adapter flange 70, 80, 90, 100 (e.g., one or more third adapter flanges 90). Additionally and/or alternatively, one or more adapter flanges 70, 80, 90, 100 are configured to engage and/or connect to one or more other elements/components of the seat assembly 20 (e.g., a duct) and/or projects from the adapter body 62 in other directions.

Referring to FIGS. 2-5, 9, and 11, the adapter body 62 includes one or more first adapter flanges 70 configured to connect the adapter 60 with the bracket 140. The first adapter flanges 70 are disposed spaced apart from one another around an outer perimeter of the adapter opening 64. In other embodiments, the first adapter flanges 70 are disposed in other positions and/or are not disposed spaced apart from one another. The first adapter flanges 70 each include an arc-shaped wall portion 72 extending from the adapter body 62 generally in a direction away from the cushion 42 (e.g., generally in a Z-direction if/when the seat bottom 40 is in a horizontal/design seating position). The first adapter flanges 70 also include a projection 74 extending generally perpendicularly or obliquely from an end of the wall portion 72 opposite the adapter body 62 such that, for example, each first adapter flange 70 is generally L-shaped. The first adapter flanges 70 are configured to elastically deform and/or flex (e.g., generally in a radially outward direction relative to the adapter body 62) to facilitate engagement with and/or disengagement from the bracket 140. In other embodiments, however, one or more first adapter flanges 70 may have other appropriate configurations and/or shapes. A first adapter flange 70 may be configured substantially identically to or differently from another first adapter flange 70. In some embodiments, such as the embodiment depicted in FIGS. 12-16, the adapter body 62 does not include any first adapter flanges 70.

The first adapter flange 70 includes a first recess 76 configured to engage a connector (e.g., a second connector 162) of the bracket 140 to connect the adapter 60 with the bracket 140. The first recess 76 has a generally rectangular and/or trapezoidal shape, but may have other appropriate shapes. The first recess 76 extends through the first adapter flange 70 generally parallel to the wall portion 72 and/or in an axial direction of the adapter body 62 and/or adapter opening 64 (e.g., generally in a Z-direction if/when the seat bottom 40 is in a horizontal/design seating position). The first recess 76 is disposed in and defined by the projection 74 of the first adapter flange 70. In other embodiments, one or more first adapter flanges 70 do not include a first recess 76, and/or the first recess 76 is at least partially disposed in and/or defined by the wall portion 72 of the first adapter flange 70.

Referring to FIGS. 3 and 5, the first adapter flange 70 includes a first opening 78 configured to engage a protrusion (e.g., a first protrusion 116A) of the air mover 110 to connect the adapter 60 with the air mover 110. The first opening 78 has a generally rectangular shape but may have other appropriate shapes. The first opening 78 extends through the first adapter flange 70 generally in a radial direction relative to the adapter body 62 (e.g., generally perpendicularly or obliquely to a Z-direction if/when the seat bottom 40 is in a horizontal/design seating position). The first opening 78 is disposed in and defined by the wall portion 72 of the first adapter flange 70. The first recess 76 and the first opening 78 are offset from one another in a circumferential direction of the adapter body 62, which may improve the strength of the first adapter flange 70 compared to, for example, configurations in which the first recess 76 and the first opening 78 are aligned with one another in the circumferential direction (e.g., when the first recess 76 and the first opening 78 are disposed one above the other in an axial direction of the adapter body 62). In other embodiments, one or more first adapter flanges 70 do not include a first opening 78, and/or the first opening 78 is at least partially disposed in and/or defined by the projection 74 of a first adapter flange 70.

Referring to FIGS. 3, 4, 10, and 11, the adapter body 62 includes a second adapter flange 80 configured to connect the adapter 60 with the bracket 140. The second adapter flange 80 extends from the adapter body 62 generally in a direction away from the cushion 42 (e.g., generally in a Z-direction if/when the seat bottom 40 is in a horizontal/design seating position). The second adapter flange 80 may elastically deform and/or flex (e.g., generally in a radial outward direction relative to the adapter body 62) when connecting/disconnecting the bracket 140 and the air mover 110. The second adapter flange 80 is disposed on the adapter body 62 proximate a rear 20A of the seat assembly 20 and/or a rear of the seat bottom frame 34 (e.g., proximate the seatback 24). The second adapter flange 80 includes a second recess 82 configured to engage a connector (e.g., the extension 168 and/or the second latch 174) of the bracket 140 to connect the adapter 60 with the bracket 140. In other embodiments, such as the embodiments depicted in FIGS. 12-16, the adapter body 62 does not include a second adapter flange 80.

Figure 10:
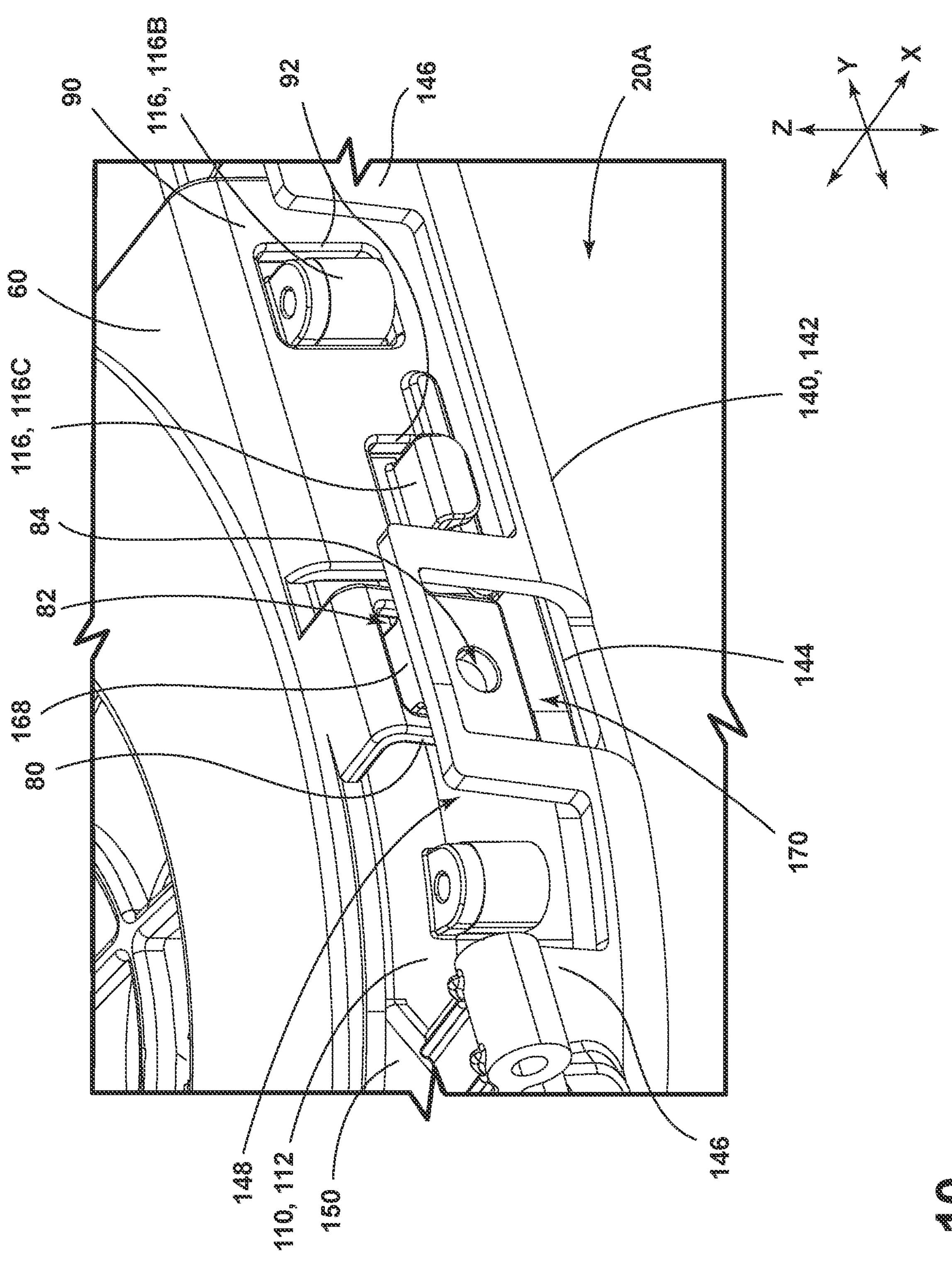
FIG. 10 is a perspective view generally illustrating an embodiment of an adapter including a second adapter flange and a third adapter flange, a bracket including an extension and a tool opening, and an air mover according to teachings of the present disclosure.

Referring to FIGS. 4, 5, and 10, the second adapter flange 80 includes a tool opening 84 configured to (e.g., temporarily) receive and/or engage a tool (e.g., an elongated member such as a rod, bar, pin, awl, screwdriver, etc.). The tool may be used to engage the second recess 82 and the extension 168. The second recess 82 and the tool opening 84 extend through the second adapter flange 80 generally perpendicularly or obliquely to an axial direction of the adapter body 62 (e.g., generally in an X-direction and/or a Y-direction if/when the seat bottom 40 is in a horizontal/design seating position). The tool opening 84 is disposed closer to a free end of the second adapter flange 80 than the second recess 82 (e.g., farther than the adapter body 62 and/or the cushion 42). In other embodiments, the second recess 82 and the tool opening 84 have their positions reversed or are disposed in other appropriate positions. In some embodiments, the second adapter flange 80, the second recess 82, and/or the tool opening 84 have other appropriate configurations and/or shapes. In other embodiments, such as the embodiment depicted in FIG. 11, the second adapter flange 80 does not include a tool opening 84.

Referring to FIGS. 3-5, 8, 10, and 14, the adapter body 62 includes a third adapter flange 90 configured to connect the adapter 60 with the air mover 110. The third adapter flange 90 extends from the adapter body 62 generally in a direction away from the cushion 42 (e.g., generally downward in a Z-direction if/when the seat bottom 40 is in a horizontal/design seating position). The third adapter flange 90 includes one or more second openings 92 configured to engage a protrusion (e.g., a second protrusion 116B and/or a third protrusion 116C) of the air mover 110 to connect the adapter 60 with the air mover 110. The second opening 92 extends through the third adapter flange 90 generally perpendicularly or obliquely to an axial direction of the adapter body 62 (e.g., generally in an X-direction and/or a Y-direction if/when the seat bottom 40 is in a horizontal/design seating position). The third adapter flange 90 is configured to elastically deform and/or flex (e.g., generally in a radial outward direction relative to the adapter body 62) to facilitate engagement with and disengagement from the air mover 110. In other embodiments, the third adapter flange 90 and/or the second opening 92 have other desired configurations and/or shapes. In some embodiments, such as the embodiment depicted in FIGS. 15-16, the adapter body 62 does not include a third adapter flange 90.

Referring to FIG. 11, the adapter body 62 includes a fourth adapter flange 100 configured to connect the adapter 60 with the bracket 140. The fourth adapter flange 100 extends from the adapter body 62 generally in a direction away from the cushion 42 (e.g., generally in a Z-direction if/when the seat bottom 40 is in a horizontal/design seating position). The fourth adapter flange 100 includes one or more third openings 102 configured to engage a connector (e.g., a first latch 172) of the bracket 140 to connect the adapter 60 with the bracket 140. The third opening 102 extends through the fourth adapter flange 100 generally perpendicularly or obliquely to an axial direction of the adapter body 62 (e.g., generally in an X-direction and/or a Y-direction if/when the seat bottom 40 is in a horizontal/design seating position). The fourth adapter flange 100 is configured to elastically deform and/or flex (e.g., generally in a radial outward direction relative to the adapter body 62) to facilitate engagement with and disengagement from the bracket 140. In some embodiments, such as the embodiments depicted in FIGS. 2-10 and 12-16, the adapter body 62 does not include a fourth adapter flange 100.

Referring to FIGS. 2-5, 8-11, 13, 14, and 16, one or more air movers 110 (e.g., fans, blowers, conveyors, etc.) are configured to provide and/or generate one or more airflows. The air mover 110 is configured to circulate air through the air conducting layer 44 such that air may be (i) pushed away from, (ii) drawn into, and/or (iii) drawn through the seat bottom 40 (e.g., through the air conducting layer 44, the cushion 42, a trim assembly, and/or one or more openings thereof). The air mover 110 may be selected/configured based on a desired (e.g., maximum) air flow volume and/or a desired temperature adjustment efficiency (e.g., a desired amount of time to cool/heat the seat 40 to a specific temperature). The air mover 110 is configured to engage and connect (e.g., releasably) to the adapter 60 to connect the air mover 110 with the seat bottom 40. In some embodiments, such as the embodiments depicted in FIGS. 2-11, the air mover 110 is also configured to engage and connect (e.g., releasably) to the bracket 140 to connect the air mover 110 with the suspension portion 50. In some embodiments, such as the embodiments depicted in FIGS. 12-16, the air mover 110 does not connect (e.g., directly) to the bracket 140. Optionally, a layer of material (e.g., rubber, fabric, and/or other soft, cushioning, or insulating materials) is disposed between the air mover 110 and the bracket 140 to restrict and/or prevent direct contact between the air mover 110 and the bracket 140. By restricting and/or preventing direct contact between the air mover 110 and the bracket 140, the layer of material may reduce and/or eliminate undesirable audible noises (e.g., rattling) that may be produced when the air mover 110 and the bracket 140 contact one another (e.g., due to vibrations).

Referring to FIGS. 3, 5, 8-10, 13, 14, and 16, the air mover 110 includes an air mover body 112. The air mover body 112 may include an upper housing and a lower housing that are connected to one another (e.g., via one or more screws, snaps, latches, adhesive). The air mover body 112 includes an air outlet 114 that is in fluid communication with the adapter opening 64 and/or the air conducting layer 44 (see, e.g., FIGS. 8, 13, 14, 16). The air outlet 114 is oriented to discharge air generally toward the air conducting layer 44, the cushion 42, and/or the user. The air mover body 112 includes one or more protrusions 116 configured to engage one or more openings of the adapter 60 (see, e.g., FIGS. 4, 5, and 15). The air mover body 112 includes one or more first protrusions 116A, which are generally L-shaped, for engaging the first openings 78 of the first adapter flanges 70. The air mover body 112 also includes one or more second protrusions 116B, which are generally cylindrical, and/or one or more third protrusions 116C, which are generally L-shaped, for engaging the second openings 92 of the third adapter flanges 90. In other embodiments, the protrusions 116 are configured identically or have other respective appropriate configurations. In some embodiments, the air mover 110 does not include first protrusions 116A, second protrusions 116B, and/or third protrusions 116C.

Referring to FIG. 16, the air mover 110 includes a plurality of latches 118 configured to connect the air mover 110 to the adapter 60. The latches 118 are disposed around the air outlet 114 and project from the air mover body 112 generally toward the adapter 60, the air conducting layer 44, and/or the cushion 42. In some embodiments, such as the embodiments depicted in FIGS. 2-14, the air mover 110 does not include latches 118.

Referring to FIGS. 3, 5, 8, 13, 14, and 16, the air mover 110 includes a plurality of projections 120 configured to connect to the bracket 140 to connect the air mover 110 with the suspension portion 50. The projections 120 extend from the air mover body 112 generally perpendicularly or obliquely relative to an axis of the air outlet 114 (e.g., generally in an X-Y plane if/when the seat bottom 40 is in a horizontal/design seating position). The projections 120 are formed as integral portions of a plate 120A, which is connected to and/or integrally formed with the air mover body 112. In other embodiments, the projections 120 and the plate 120A are separate components and/or disposed in other positions. In some embodiments, such as the embodiment depicted in FIG. 11, the air mover 110 does not include projections 120 (e.g., the bracket 140 is not connected directly to the air mover 110 and is held by the adapter flanges 70, 80, 90, 100).

Referring to FIGS. 5, 8, 14, 16, the projections 120 include one or more projection recesses (e.g., a first projection recess 122, a second projection recess 124). The projection recesses 122, 124 extend completely through the projection 120 (e.g., generally in a Z-direction if/when the seat bottom 40 is in a horizontal/design seating position). One or more projection recesses 122, 124 do not extend completely through the projection 120 in other embodiments.

Referring to FIGS. 5, 8, 14, 16, each projection 120 includes one or more first projection recesses 122 configured to engage a connector, fastener, or other similar structure. In some embodiments, such as the embodiments depicted in FIGS. 2-14, each first projection recess 122 is configured to engage a connector/fastener 180 (e.g., a bolt 180A, a rubber push fastener 180B) that is separate/independent of the bracket 140 (see, e.g., FIGS. 2-4, 8, 13, and 14). The connector/fastener 180 may simultaneously engage a first projection recess 122 and a recess of the bracket 140 (e.g., the bracket flange recess 156 of the associated bracket flange 150) to connect the air mover 110 with the bracket 140. In other embodiments, such as the embodiment depicted in FIGS. 15-16, each first projection recess 122 is configured to engage a connector of the bracket 140 (e.g., the first connector 152) to connect the air mover 110 to the bracket 140 (see, e.g., FIG. 16).

Referring to FIG. 16, the projections 120 include a second projection recess 124 configured to engage a pin 154 of the bracket 140. The engagement of the second projection recess 124 and the pin 154 may align the first projection recess 122 with the first connector 152 and/or with the bracket flange recess 156, which may simplify the process of connecting the air mover 110 and the bracket 140. Additionally and/or alternatively, one or more projections 120 may not connect to a bracket 140 (e.g., may only be used to properly position and/or orient the air mover 110 within the receptacle 148 of the bracket 140) and/or may not include a first projection recess 122 and/or a second projection recess 124. In some embodiments, such as the embodiments depicted in FIGS. 2-14, the projections 120 do not include a second projection recess 124.

Referring to FIGS. 2-4 and 6-16, the bracket 140 is configured to receive and protect/shield at least a portion of the air mover 110 and/or at least a portion of the adapter 60. In some embodiments, the bracket 140 is designed and/or customized based on the configuration of the air mover 110. For example, the bracket 140 may protect the air mover 110 from interference and/or damage from a foot of a user sitting behind the seat assembly 20. The bracket 140 is configured to connect to one or more portions of the suspension portion 50. In some embodiments, the bracket 140 is overmolded onto the suspension wires 54 of the suspension portion 50 (see, e.g., FIGS. 6, 7, 9, and 14), which may eliminate the need for separate connectors that attach the bracket 140 to the suspension portion 50, may reduce the risk of the bracket 140 unintentionally disconnecting from the suspension portion 50, and/or may reduce the complexity of assembling the seat assembly 20.

Referring to FIGS. 3, 4, 6, 7, and 9-16, the bracket 140 includes a bracket body 142 configured to receive at least a portion of the air mover 110 and/or at least a portion of the adapter 60. The bracket body 142 includes a bottom 144 and one or more walls 146 that at least partially define a receptacle 148, which is configured to receive at least a portion of the air mover 110 and/or at least a portion of the adapter 60. The bottom 144 extends generally parallel to the air conducting layer 44 and/or the seat bottom frame 34 (e.g., generally in an X-Y plane if/when the seat bottom 40 is in a horizontal/design seating position) and/or generally perpendicular or oblique to an axis of the adapter opening 64 and/or the air outlet 114 (e.g., generally perpendicular or oblique to the Z-direction if/when the seat bottom 40 is in a horizontal/design seating position). The wall 146 projects from the bottom 144 toward the air conducting layer 44, the cushion 42, and/or the user (e.g., generally in the Z-direction if/when the seat bottom 40 is in a horizontal/design seating position) and extends around at least a portion of a perimeter of the bottom 144.

Referring to FIGS. 2-4, 6-8, and 12-16, the bracket 140 includes a plurality of bracket flanges 150. The bracket flanges 150 are disposed at an end of the wall 146 opposite the bottom 144 and extend generally perpendicularly or obliquely from the wall 146 (e.g., generally in an X-Y plane if/when the seat bottom 40 is in a horizontal/design seating position). The bracket flanges 150 are overmolded onto the suspension wires 54 of the suspension portion 50 to connect the bracket 140 (e.g., the bracket body 142) with the suspension portion 50 (sec, e.g., FIGS. 6, 7, 9, and 14). The bracket body 142 is suspended from (e.g., below) the suspension wires 54 of the suspension portion 50 via the bracket flanges 150. The suspension portion 50 is not disposed between (i) the air mover 110 and the adapter 60 and/or (ii) the air mover 110 and the air conducting layer 44. This, in turn, prevents and/or limits the suspension portion 50 from interfering with the connection of the air mover 110 to the adapter 60 and/or simplifies assembly of the seat assembly 20.

The bracket flanges 150 are configured to connect to the projections 120 of the air mover 110 to connect the bracket 140 and suspension portion 50 with the air mover 110. Each bracket flange 150 is configured to connect to an associated projection 120 of the air mover 110 (e.g., via a first connector 152, a bolt 180A, a rubber push fastener 180B). In other embodiments, such as the embodiment depicted in FIG. 11, the bracket flanges 150 are not configured to connect to the projection 120 of the air mover 110, and/or the bracket 140 is not configured to connect to the air mover 110.

Referring to FIGS. 6-8, 12, and 14, the bracket flanges 150 include a bracket flange recess 156 configured to engage a connector/fastener 180 to connect the air mover 110 with the bracket 140. The connector/fastener 180 may simultaneously engage the first projection recess 122 of the associated projection 120 to connect the bracket flange 150 with the associated projection 120. In some embodiments, such as the embodiment depicted in FIGS. 11, 15, and 16, the bracket flanges 150 do not include a bracket flange recess 156.

Referring to FIGS. 2-4 and 8, the connector/fastener 180 is configured as a bolt 180A. Referring to FIGS. 13 and 14, the connectors/fasteners 180 are configured as rubber push fasteners 180B. Optionally, one or more rubber push fasteners 180B are molded onto the air mover 110 and/or the bracket 140, and/or may be composed of and/or include other appropriate materials. In some embodiments, a connector/fastener 180 may be configured as a hook, a fastener, a clip, adhesive, screws, and/or other similar structure. While bolts 180A are depicted in FIGS. 2-4 and 8, rubber push fasteners 180B may be used instead of one or more of the bolts 180A in the embodiment depicted in FIGS. 2-10. While rubber push fasteners 180B are depicted in FIGS. 13 and 14, bolts 180A may be used instead of one or more of the rubber push fasteners 180B in the embodiment depicted in FIGS. 12-14. Any number of connector/fasteners 180 (e.g., bolts 180A, rubber push fasteners 180B) and any combination of connector/fasteners 180 (e.g., bolts 180A, rubber push fasteners 180B) may be used as desired for a particular design of the seat assembly 20, so long as the air mover 110 and the bracket 140 can be properly connected to one another. In some embodiments, such as the embodiment depicted in FIGS. 11, 15, and 16, the air mover 110 and the bracket 140 are not connected by connectors/fasteners 180.

Referring to FIG. 14, the rubber push fastener 180B includes a fastener body 182, a first circumferential groove 184 for engaging a projection 120 of the air mover 110, and a second circumferential groove 186 for engaging a bracket flange 150. The first groove 184 and the second groove 186 are disposed spaced apart from one another (e.g., a portion 182A of the fastener body 182 may be disposed between the projection 120 and the bracket flange 150) such that the rubber push fastener 180B restricts and/or prevents direct contact between the bracket 140 and the air mover 110 (e.g., the projection 120 and the bracket flange 150). By restricting and/or preventing direct contact between the bracket 140 and the air mover 110, the rubber push fastener 180B may reduce and/or eliminate undesirable audible noises (e.g., rattling) that may be produced when the bracket 140 and the air mover 110 (which may be composed of and/or include plastic) contact one another.

Referring to FIGS. 15 and 16, the bracket flanges 150 each include a connector (e.g., a first connector 152) configured to engage the first projection recess 122 of an associated projection 120 to connect the bracket flange 150 with the associated projection 120. The first connector 152 may be configured as a clip, latch, hook, and/or other similar structure. The bracket flanges 150 also include a pin 154 configured to engage the second projection recess 124 of the associated projection 120. The first connector 152 and the pin 154 are integral portions of the bracket flange 150 and project from the bracket flange 150 generally toward the cushion 42. The pin 154 projects further from the bracket flange 150 than the first connector 152 (e.g., generally in a Z-direction if/when the seat bottom 40 is in a horizontal/design seating position). As such, when connecting the bracket 140 and the air mover 110, the pins 154 engage the second projection recesses 124 prior to the first connectors 152 engaging the first projection recesses 122. The prior engagement of the pins 154 and the second projection recesses 124 aligns the first connectors 152 with the first projection recesses 122, which may simplify the process of connecting the air mover 110 and the bracket 140. In some embodiments, the first connector 152 and/or the pin 154 of one or more bracket flanges 150 may be separate components from the bracket flanges 150 (e.g., may not be integral portions) and/or may have other appropriate configurations. In some embodiments, such as the embodiments depicted in FIGS. 2-14, the bracket flanges 150 do not include a first connector 152 or a pin 154.

Referring to FIGS. 15 and 16, the bracket body 142 and the bracket flanges 150 are configured to resist deformation and/or flexing such that the first connectors 152 remain at a substantially fixed distance from one another when the suspension portion 50 is flexed and/or deformed by a user sitting on the seat assembly 20. This reduces and/or eliminates the additional forces and/or loads that may be applied to the first connectors 152 (e.g., forces and/or loads perpendicular and/or oblique to the first connectors 152 and/or the Z-direction) when the suspension portion 50 is flexed and/or deformed that could otherwise cause the first connectors 152 to fatigue and/or fracture.

In some embodiments, one or more bracket flanges 150 may not have a first connector 152, may have several first connectors 152, may not have a pin 154, may have several pins 154, may not have a bracket flange recess 156, and/or may have several bracket flange recesses 156. In some embodiments, one or more bracket flanges 150 may include a combination of first connectors 152, pins 154, and/or bracket flange recesses 156. For example, one or more bracket flanges 150 may include a pin 154 and a bracket flange recess 156 (e.g., instead of a first connector 152). In such embodiments, the engagement of the pin 154 and the second projection recess 124 aligns the bracket flange recess 156 and the first projection recess 122, which may simplify the process of engaging the connector/fastener 180 (e.g., the rubber push fastener 180B) with both the bracket flange recess 156 and the first projection recess 122. As another example, one or more bracket flanges 150 may include the first connector 152, the pin 154, and the bracket flange recess 156. In such embodiments, the engagement of the pin 154 and the second projection recess 124 aligns (i) the first connector 152 and the first projection recess 122 and (ii) the bracket flange recess 156 and another first projection recess 122. This may simplify the process of engaging the connector/fastener 180 (e.g., the rubber push fastener 180B) with both the bracket flange recess 156 and the first projection recess 122. By having first connectors 152 and connectors/fasteners 180 (e.g., the rubber push fastener 180B), the connection between the air mover 110 and the bracket 140 is strengthened and/or undesirable audible noises (e.g., rattling) may be reduced and/or eliminated.

Referring to FIGS. 2-4, 6, 7, and 9, the bracket 140 includes a plurality of wall recesses 160 configured to receive at least a portion of an adapter flange (e.g., an associated first adapter flange 70). The wall recesses 160 are disposed in the wall 146 of the bracket body 142, but may additionally and/or alternatively be disposed at least partially in the bottom 144 of the bracket body 142. The wall recess 160 extend generally toward the bottom 144 of the bracket body 142 from an end of the wall 146 opposite the bottom 144. In some embodiments, one or more wall recesses 160 extend from the end of the wall 146 all the way to the bottom 144, which may divide the wall 146 into two separate portions and/or regions. In other embodiments, one or more wall recesses 160 may be completely defined in the wall 146 and/or the bottom 144 such that the wall recess 160 has a closed outer perimeter (e.g., the wall recess 160 may not extend out the end of the wall 146 opposite the bottom 144). In some embodiments, such as the embodiments depicted in FIGS. 12-16, the bracket 140 does not include wall recesses 160 configured to receive at least a portion of an adapter flange.

Referring to FIGS. 2-4, 6, 7, 9, and 11, the bracket 140 includes one or more connectors (e.g., second connectors 162) for connecting the bracket 140 with the adapter 60, which may also connect the suspension portion 50 to one or more portions of the seat bottom 40 (e.g., the adapter 60, the air conducting layer 44, the cushion 42). The second connectors 162 are configured to engage the first recesses 76 of the first adapter flanges 70 to connect the bracket 140 with the adapter 60. Each of the second connectors 162 are disposed on the bottom 144 of the bracket body 142 proximate an associated wall recess 160. The second connectors 162 each include a first portion 164 extending from the bottom 144 generally away from the receptacle 148 and/or the cushion 42 (e.g., generally in a Z-direction if/when the seat bottom 40 is in a horizontal/design seating position), and a second portion 166 extending generally perpendicularly or obliquely from an end of the first portion 164 opposite the bottom 144 such that, for example, the second connectors 162 are generally L-shaped. In some embodiments, such as the embodiments depicted in FIGS. 12-16, the bracket 140 does not include second connectors 162.

Referring to FIGS. 4, 6, 7, and 10, the bracket 140 includes a connector (e.g., an extension 168) configured to engage the second recess 82 of the second adapter flange 80. The connector is configured as an extension 168, which is generally L-shaped, that projects from the wall 146 (e.g., substantially parallel to the bottom 144 of the bracket body 142) into the receptacle 148. The bracket 140 also includes a wall opening 170 through which at least a portion of a tool (e.g., an elongated member such as a rod, bar, pin, awl, screwdriver, etc.) may pass to engage the tool opening 84 of the second adapter flange 80. The wall opening 170 is larger than the tool opening 84 to allow the tool to be more easily manipulated within the wall opening 170. The wall opening 170 extends through the wall 146 in a direction substantially parallel to the extension 168 (e.g., generally perpendicularly or obliquely to the bottom and/or the Z-direction if/when the seat bottom 40 is in a horizontal/design seating position). The wall opening 170 is disposed closer to the bottom 144 of the bracket body 142 than the extension 168, but the wall opening 170 and the extension 168 may have their positions reversed or may be disposed in other appropriate positions in other embodiments. When connecting the adapter 60 and the bracket 140 (e.g., after connecting the air mover 110 to the adapter 60 and/or to the bracket 140), an assembly technician may pass at least a portion of a tool through the wall opening 170 and insert the tool into the tool opening 84. Once the tool is engaged with the tool opening 84, the user may adjust the second adapter flange 80 toward the bottom 144 of the bracket body 142 using the tool (e.g., by adjusting a position and/or an orientation of the tool) to engage the second recess 82 and the extension 168. Additionally and/or alternatively, once the tool is engaged with the tool opening 84, the technician may use the tool to restrict and/or limit movement of the adapter 60 and/or the second adapter flange 80 while adjusting the bracket 140 toward the adapter 60 (e.g., via pressing the bottom 144 of the bracket body 142 toward the adapter body 62) to engage the second recess 82 and the extension 168. In some embodiments, such as the embodiments depicted in FIGS. 11-16, the bracket 140 does not include an extension 168 or a wall opening 170.

Referring to FIGS. 1-4, the extension 168 and the wall opening 170 are disposed in a portion of the wall 146 proximate a rear 20A of the seat assembly 20, the seat bottom 40, and/or the seat bottom frame 34 (e.g., proximate the seatback 24). When the adapter 60 and bracket 140 are connected, the second adapter flange 80 is disposed at least partially within the receptacle 148 and the extension 168 engages the second recess 82 (sec, e.g., FIG. 10). As such, when the bracket 140 is contacted, bumped, impacted, etc. (e.g., near the second adapter flange 80), the bracket body 142 may protect and/or shield the second adapter flange 80 from direct contact (at least to some extent), and/or the impact may press the extension 168 toward and/or further into second recess 82. This, in turn, may reduce the likelihood of the bracket 140 and the second adapter flange 80 (e.g., the extension 168 and the second recess 82) becoming disengaged when such contact occurs. The bracket 140 may likely be contacted and/or impacted from the rear 20A of the seat assembly 20 since, for example, a user sitting in a seat disposed behind the seat assembly 20 may inadvertently bump or kick the bracket 140. Therefore, the position of the second adapter flange 80 and the extension 168 proximate a rear 20A of the seat assembly 20 and/or the seat bottom frame 34 (e.g., proximate the seatback 24) may increase the stability of the connection between the adapter 60 and the bracket 140 (e.g., compared to embodiments where the first adapter flange 70 and the second connector 162, which are connected outside of the receptacle 148 and could be susceptible to direct contact, are positioned proximate the rear 20A of the seat assembly 20).

Referring to FIG. 11, the bracket 140 includes one or more connectors (e.g., a first latch 172 and a second latch 174) for connecting the bracket 140 with the adapter 60, which may also connect the suspension portion 50 to one or more portions of the seat bottom 40 (e.g., the adapter 60, the air conducting layer 44, the cushion 42). The first latch 172 is configured to engage the third opening 102 of the fourth adapter flange 100 outside of the receptacle 148 to connect the bracket 140 with the adapter 60. The second latch 174 is configured to engage the second recess 82 of the second adapter flange 80 outside of the receptacle 148 to connect the bracket 140 with the adapter 60. The latches 172, 174 are each generally L-shaped. The latches 172, 174 project from the wall 146 generally away from the receptacle 148 and are disposed outside of the receptacle 148. The bracket 140 may include one or more latches 172, 174 and any combination of types of latches 172, 174 as may be desired for a particular design of the seat assembly 20. In some embodiments, such as the embodiments depicted in FIGS. 2-10 and 12-16, the bracket 140 does not include latches 172, 174.

Figure 9:
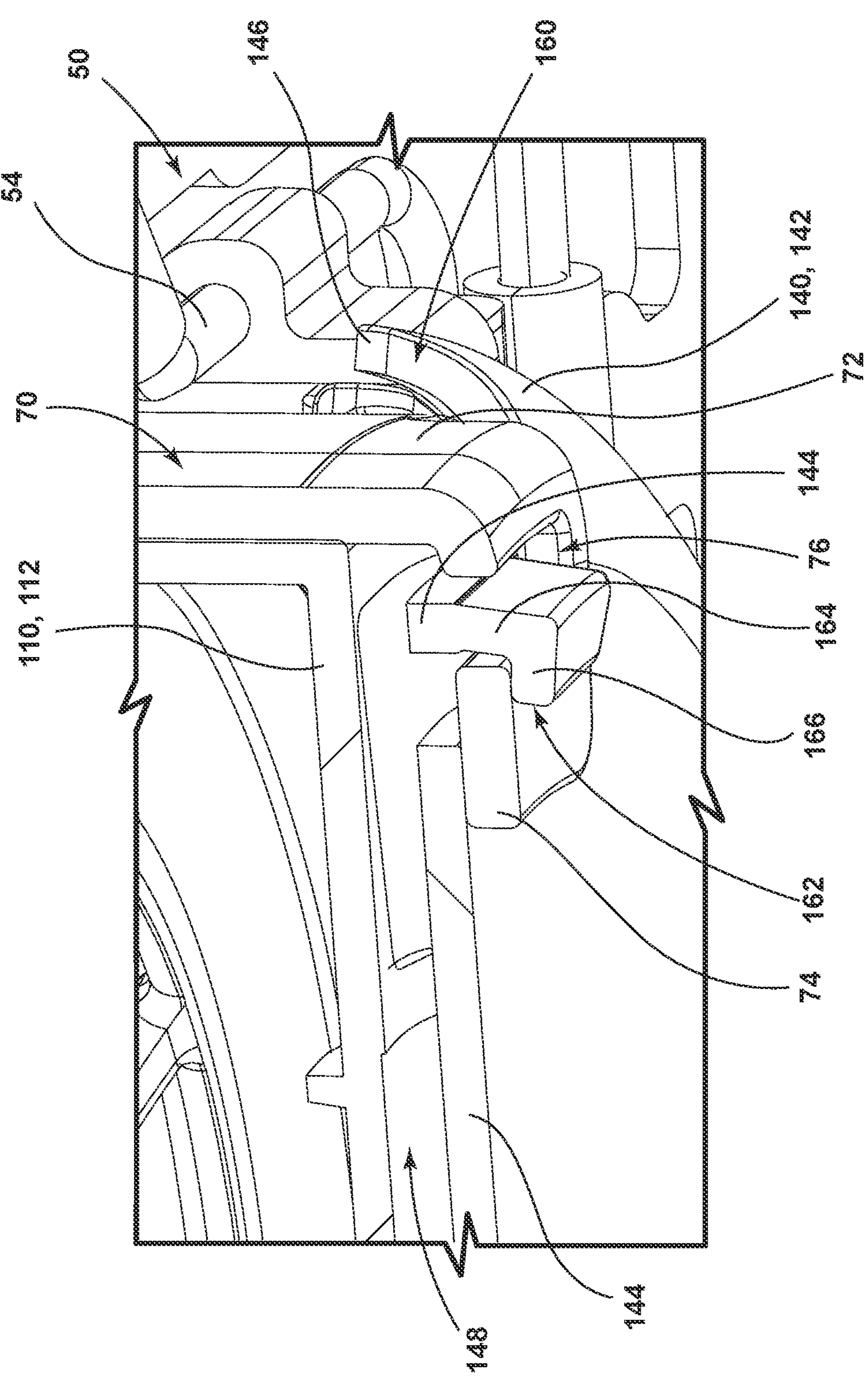
FIG. 9 is a cross-sectional view generally illustrating an embodiment of a first adapter flange of an adapter and a second connector of a bracket according to teachings of the present disclosure.

In some embodiments, such as generally depicted in FIGS. 2-10, when the bracket 140 is connected with the air mover 110 and the adapter 60, the air mover 110 and the adapter 60 are at least partially disposed in the receptacle 148 of the bracket 140 (see, e.g., FIGS. 3 and 8-10). Referring to FIGS. 2, 4, and 9, the first adapter flanges 70 are disposed at least partially in the receptacle 148, extend through the wall recesses 160, and engage the second connectors 162 to connect the bracket 140 with the adapter 60. The wall portion 72 of each first adapter flange 70 is at least partially disposed in the associated wall recess 160, and the projection 74 of each first adapter flange 70 is disposed below the bottom 144 of the bracket body 142 (e.g., relative to a Z-direction if/when the seat bottom 40 is in a horizontal/design seating position). The first recess 76 of each first adapter flange 70 is engaged with the associated second connector 162. The second connectors 162 each extend through the first recess 76 of the associated first adapter flange 70 such that the first portion 164 of the second connector 162 is disposed at least partially in the first recess 76 and the second portion 166 of the second connector 162 engages, contacts, and/or at least partially overlaps the projection 74 of the associated first adapter flange 70 (e.g., at least a portion of the projection 74 of the first adapter flange 70 is between the second portion 166 of the second connector 162 and the bottom 144 of the bracket body 142). The first opening 78 of the first adapter flanges 70 are engaged with an associated first protrusion 116A of the air mover 110 to connect the adapter 60 with the air mover 110 (see, e.g., FIGS. 2 and 5). The second adapter flange 80 is disposed at least partially in the receptacle 148 and the extension 168 of the bracket 140 is engaged with the second recess 82 of the second adapter flange 80 to connect the bracket 140 with the adapter 60 (see, e.g., FIG. 8). The third adapter flange 90 is disposed at least partially in the receptacle 148 and the second openings 92 of the third adapter flange 90 are engaged by the second and third protrusions 116B, 116C of the air mover 110 to connect the adapter 60 with the air mover 110 (see, e.g., FIGS. 4, 5, 8, and 10). The bracket flanges 150 and the projections 120 of the air mover 110 are connected to one another via bolts 180A, which engage the bracket flange recesses 156 of the bracket flange 150 and the first projection recesses 122 of the air mover 110 (see, e.g., FIGS. 2, 4, and 8).

Referring to FIG. 11, when the bracket 140 is connected with the air mover 110 and the adapter 60, the air mover 110 and the adapter 60 are at least partially disposed in the receptacle 148 of the bracket 140. The first adapter flange 70 and the third adapter flange 90 are engaged with the bracket 140 and the air mover 110, respectively, as described above with respect to the embodiment of FIGS. 2-10. The second adapter flange 80 is disposed at least partially outside of the receptacle 148 and the second latch 174 of the bracket 140 is engaged with the second recess 82 of the second adapter flange 80 to connect the bracket 140 with the adapter 60. The fourth adapter flange 100 is disposed outside of the receptacle 148, and the first latch 172 of the bracket 140 is engaged with the third opening 102 of the fourth adapter flange 100 to further connect the bracket 140 with the adapter 60. The bracket 140 is not connected directly to the air mover 110. Alternatively, the air mover 110 includes projections 120 and the bracket flanges 150 include first connectors 152 and pins 154 that engage first projection recesses 122 and second projection recesses 124 of the projections 120 to connect the bracket 140 and the air mover 110 (see, e.g., FIG. 16).

In some embodiments, as generally depicted in FIGS. 12-14, when the bracket 140 is connected with the air mover 110 and when the air mover 110 is connected with the adapter 60, the air mover 110 and the adapter 60 are at least partially disposed in the receptacle 148 of the bracket 140. The third adapter flange 90 is disposed at least partially in the receptacle 148 and the second openings 92 of the third adapter flange 90 are engaged by the second and third protrusions 116B, 116C of the air mover 110 to connect the adapter 60 with the air mover 110. The bracket flanges 150 and the projections 120 of the air mover 110 are connected to one another via rubber push fasteners 180B (see, e.g., FIG. 13). The rubber push fasteners 180B each engage the bracket flange recess 156 of an associated bracket flange 150 such that the associated bracket flange 150 is disposed in and engages the second circumferential groove 186 (see, e.g., FIG. 14). The rubber push fasteners 180B also each engage the first projection recess 122 of the associated projection 120 of the air mover 110 such that the associated projection 120 is disposed in and engages the first circumferential groove 184 (sec, e.g., FIG. 14).

In some embodiments, such as generally depicted in FIGS. 15 and 16, when the bracket 140 is connected with the air mover 110 and the air mover 110 is connected with the adapter 60, the air mover 110 is at least partially disposed in the receptacle 148 of the bracket 140 (sec, e.g., FIG. 16). The bracket flanges 150 and the projections 120 of the air mover 110 are connected to one another via the first connectors 152 engaging the first projection recesses 122 of the air mover 110 and the pins 154 engaging the second projection recesses 124 of the air mover 110 (see, e.g., FIG. 16). The latches 118 of the air mover 110 engage the adapter 60 connecting the air mover 110 and the suspension portion 50 with the adapter 60 and the seat bottom 40.

While some embodiments, such as those depicted in FIGS. 15 and 16, that include bracket flanges 150 with first connectors 152 and pins 154 that engage first and second projection recesses 122, 124 of the air mover 110, the configurations of the bracket flanges 150 and the projections 120 may be reversed in other embodiments such that, for example, one or more projections 120 of the air mover 110 include the first connector 152 and/or the pin 154 that engage first and/or second projection recesses 122, 124 in the bracket flanges 150.

This disclosure includes, without limitation, the following embodiments:

1. A bracket for a seat assembly, the bracket comprising: a bracket body having a receptacle that receives at least a portion of an air mover of said seat assembly; and at least one bracket flange extending from the bracket body; wherein the at least one bracket flange connects with said air mover via a connector to connect said air mover with the bracket body; and the bracket body and/or the at least one bracket flange connect to a suspension portion of said seat assembly.
2. The bracket according to embodiment 1, wherein: the at least one bracket flange includes the connector; and the connector engages a first recess of said air mover to releasably connect the at least one bracket flange and said air mover.
3. The bracket according to any preceding embodiment, wherein the at least one bracket flange includes a pin that engages a second recess of said air mover to align the connector with said first recess.
4. The bracket according to any preceding embodiment, wherein the pin projects farther from the at least one bracket flange than the connector such that, during assembly and prior to the connector engaging said first recess, the pin engages said second recess and aligns the connector with said first recess.
5. The bracket according to any preceding embodiment, wherein: the at least one bracket flange includes a plurality of bracket flanges including respective connectors; the bracket body and the plurality of bracket flanges are resistant to flexing such that, when subjected to a force via a user sitting on said seat assembly, the connectors remain at a substantially fixed distance from one another.
6. The bracket according to any preceding embodiment, wherein: the at least one bracket flange includes a bracket flange recess; and the connector includes a rubber fastener that simultaneously engages the bracket flange recess and a recess of said air mover to connect the at least one bracket flange with said air mover.
7. A seat assembly, comprising: the bracket according to any preceding embodiment; the air mover; and the suspension portion; wherein the bracket is overmolded on the suspension portion.
8. The seat assembly according to embodiment 7, including an air conducting layer, wherein: the air mover is connected to the air conducting layer; and the suspension portion is not disposed between the air mover and the air conducting layer.
9. The seat assembly according to any preceding embodiment, including a cushion and an adapter, wherein: the air mover is connected to the adapter; and the suspension portion is not disposed between the air mover and the adapter.
10. A bracket for a seat assembly, comprising: a bracket body having a receptacle configured to receive at least a portion of an air mover of said seat assembly; and at least one bracket flange extending from the bracket body; wherein the bracket body includes a connector that connects to an adapter of said seat assembly; said adapter connects said air mover to said seat assembly; and the at least one bracket flange connects to a suspension portion of said seat assembly.
11. The bracket of embodiment, wherein the connector engages a recess in an adapter flange of said adapter.
12. The bracket according to any preceding embodiment, wherein: the bracket body includes a bottom and a wall extending around at least a portion of a perimeter of the bottom to at least partially define the receptacle; the connector includes a latch projecting from the wall of the bracket body away from the receptacle; and the latch engages an opening of an adapter flange of said adapter outside of the receptacle.
13. The bracket according to any preceding embodiment, wherein: the bracket body includes a bottom and a wall extending around at least a portion of a perimeter of the bottom to at least partially define the receptacle; and the connector projects from the bottom of the bracket body away from the receptacle.
14. The bracket according to any preceding embodiment, wherein: the wall includes a wall recess receive at least a portion of an adapter flange of said adapter; and the connector is disposed proximate the wall recess and engages a recess of said adapter flange.
15. The bracket according to any preceding embodiment, wherein: the wall of the bracket body includes a latch projecting from the wall away from the receptacle; and the latch engages an opening of another adapter flange of said adapter outside of the receptacle.
16. The bracket according to any preceding embodiment, wherein: the bracket body includes a bottom and a wall extending around at least a portion of a perimeter of the bottom to at least partially define the receptacle; the connector comprises an extension projecting from the wall of the bracket body into the receptacle; and the extension engages a recess in said adapter.

17. The bracket according to any preceding embodiment, wherein: said adapter includes an adapter flange including said recess and a tool opening; and the wall of the bracket body includes a wall opening through which a tool is passable to engage said tool opening of said adapter flange to facilitate engagement of the extension with said recess of said adapter.
18. The bracket according to any preceding embodiment, wherein: the at least one bracket flange connects with said air mover via another connector to connect said air mover with the bracket body; and the another connector is as at least one of: an integral portion of the at least one bracket flange; and a rubber push-in fastener.
19. A seat assembly, comprising: the bracket of according to any preceding embodiment; the adapter; the air mover; and the suspension portion; wherein the at least one bracket flange is overmolded on the suspension portion.
20. A seat assembly, comprising: the bracket of any preceding embodiment; the adapter; the air mover; and the suspension portion; wherein the adapter includes a first adapter flange and a second adapter flange; the first adapter flange includes a first recess and an opening; the second adapter flange includes a second recess; the bracket body includes a bottom and a wall extending around at least a portion of a perimeter of the bottom to at least partially define the receptacle; the wall of the bracket body includes an extension projecting from the wall into the receptacle; the connector projects from the bottom of the bracket body away from the receptacle; the connector is engaged with the first recess of the first adapter flange to connect the bracket and the adapter; the air mover includes a protrusion that is engaged with the opening of the first adapter flange to connect the air mover and the adapter; and the extension is engaged with the second recess of the second adapter flange to connect the bracket and the adapter.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first element could be termed a second element, and, similarly, a second element could be termed a first element, without departing from the scope of the various described embodiments. The first element and the second element are both element, but they are not the same element.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including." "comprises," and/or "comprising." when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting." depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]." depending on the context.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. Uses of "e.g." and "such as" in the specification are to be construed broadly and are used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

What is claimed is:

1. A bracket for a seat assembly, the bracket comprising:

a bracket body comprising a receptacle that receives at least a portion of an air mover of the seat assembly, wherein the air mover is connected to an air conducting layer; and at least one bracket flange extending from the bracket body, wherein the at least one bracket flange is configured to connect with the air mover via a connector to connect the air mover with the bracket body, and at least one of the bracket body and the at least one bracket flange is connected to a suspension portion of the seat assembly, and wherein the suspension portion is not disposed between the air mover and the air conducting layer.

2. The bracket of claim 1, wherein:

the at least one bracket flange includes the connector, and the connector engages a first recess of the air mover to releasably connect the at least one bracket flange and the air mover.

3. The bracket of claim 2, wherein the at least one bracket flange includes a pin that engages a second recess of the air mover to align the connector with the first recess.

4. The bracket of claim 3, wherein the pin projects farther from the at least one bracket flange than the connector such that, during assembly and prior to the connector engaging the first recess, the pin engages the second recess and aligns the connector with the first recess.

5. The bracket of claim 1, wherein:

the at least one bracket flange includes a plurality of bracket flanges including respective connectors, the bracket body and the plurality of bracket flanges are resistant to flexing such that, when subjected to a force via a user sitting on the seat assembly, the connectors remain at a substantially fixed distance from one another.

6. The bracket of claim 1, wherein:

the at least one bracket flange includes a bracket flange recess, and the connector includes a rubber fastener that simultaneously engages the bracket flange recess and a recess of the air mover to connect the at least one bracket flange with the air mover.

7. A seat assembly, comprising:

the bracket of claim 1;

the air mover; and the suspension portion, wherein the bracket is overmolded on the suspension portion.

8. The seat assembly of claim 7, including a cushion and an adapter, wherein:

the air mover is connected to the adapter, and the suspension portion is not disposed between the air mover and the adapter.

9. The bracket of claim 1, further comprises a material layer disposed between the air mover and the bracket body to restrict direct contact between the air mover and the bracket body.

10. A bracket for a seat assembly, comprising:

a bracket body having a receptacle configured to receive at least a portion of an air mover of the seat assembly, wherein the air mover is connected to an air conducting layer; and at least one bracket flange extending from the bracket body;

wherein the bracket body includes a connector that connects to an adapter of the seat assembly, wherein the adapter connects the air mover to the seat assembly, and the at least one bracket flange connects to a suspension portion of the seat assembly, and wherein the suspension portion is not disposed between the air mover and the air conducting layer.

11. The bracket of claim 10, wherein the connector engages a recess in an adapter flange of the adapter.

12. The bracket of claim 10, wherein:

the bracket body includes a bottom and a wall extending around at least a portion of a perimeter of the bottom to at least partially define the receptacle, the connector includes a latch projecting from the wall of the bracket body away from the receptacle, and the latch engages an opening of an adapter flange of the adapter outside of the receptacle.

13. The bracket of claim 10, wherein:

the bracket body includes a bottom and a wall extending around at least a portion of a perimeter of the bottom to at least partially define the receptacle, and the connector projects from the bottom of the bracket body away from the receptacle.

14. The bracket of claim 13, wherein:

the wall includes a wall recess which is configured to receive at least a portion of an adapter flange of the adapter, and the connector is disposed proximate the wall recess and engages a recess of the adapter flange.

15. The bracket of claim 14, wherein:

the wall of the bracket body includes a latch projecting from the wall away from the receptacle, and the latch engages an opening of another adapter flange of the adapter outside of the receptacle.

16. The bracket of claim 10, wherein:

the bracket body includes a bottom and a wall extending around at least a portion of a perimeter of the bottom to at least partially define the receptacle, the connector comprises an extension projecting from the wall of the bracket body into the receptacle, and the extension engages a recess in the adapter.

17. The bracket of claim 16, wherein:

the adapter includes an adapter flange including the recess and a tool opening; and the wall of the bracket body includes a wall opening through which a tool is passable to engage the tool opening of the adapter flange to facilitate engagement of the extension with the recess of the adapter.

18. The bracket of claim 10, wherein:

the at least one bracket flange connects with the air mover via another connector to connect the air mover with the bracket body, and the another connector is as at least one of:

an integral portion of the at least one bracket flange; and a rubber push-in fastener.

19. A seat assembly, comprising:

the bracket of claim 10;

the adapter;

the air mover; and the suspension portion, wherein the at least one bracket flange is overmolded on the suspension portion.

20. A seat assembly, comprising:

the bracket of claim 10;

the adapter;

the air mover; and the suspension portion, wherein the adapter includes a first adapter flange and a second adapter flange, the first adapter flange includes a first recess and an opening, the second adapter flange includes a second recess, the bracket body includes a bottom and a wall extending around at least a portion of a perimeter of the bottom to at least partially define the receptacle, the wall of the bracket body includes an extension projecting from the wall into the receptacle, the connector projects from the bottom of the bracket body away from the receptacle, the connector is engaged with the first recess of the first adapter flange to connect the bracket and the adapter, the air mover includes a protrusion that is engaged with the opening of the first adapter flange to connect the air mover and the adapter, and the extension is engaged with the second recess of the second adapter flange to connect the bracket and the adapter.

* * * * *